(12) United States Patent
Kwak

(10) Patent No.: US 10,144,900 B1
(45) Date of Patent: Dec. 4, 2018

(54) POLY (METH)ACRYLATE STAR POLYMERS FOR LUBRICANT ADDITIVE APPLICATIONS

(71) Applicant: Afton Chemical Corporation, Richmond, VA (US)

(72) Inventor: Yungwan Kwak, Glen Allen, VA (US)

(73) Assignee: Afton Chemical Corporation, Richmond, VA (US)

( * ) Notice: Subject to any disclaimer, the term of this patent is extended or adjusted under 35 U.S.C. 154(b) by 0 days.

(21) Appl. No.: 15/887,006

(22) Filed: Feb. 2, 2018

(51) Int. Cl.
C10M 151/02 (2006.01)
C10M 169/04 (2006.01)
C08F 293/00 (2006.01)

(52) U.S. Cl.
CPC ....... *C10M 151/02* (2013.01); *C08F 293/005* (2013.01); *C10M 169/041* (2013.01); *C08F 2438/03* (2013.01); *C08F 2800/10* (2013.01); *C10M 2203/003* (2013.01); *C10M 2221/02* (2013.01); *C10N 2220/021* (2013.01); *C10N 2220/022* (2013.01); *C10N 2230/02* (2013.01)

(58) Field of Classification Search
CPC ............ C10M 151/02; C10M 169/041; C10M 2203/003; C10M 2221/02; C10N 2220/021; C10N 2220/022; C10N 2230/02; C08F 293/005; C08F 2438/03; C08F 2800/10
See application file for complete search history.

(56) References Cited

U.S. PATENT DOCUMENTS

| | | | |
|---|---|---|---|
| 3,364,182 A | 1/1968 | McDonald | |
| 5,079,298 A | 1/1992 | Kuriyama et al. | |
| 5,468,477 A | 11/1995 | Kumar et al. | |
| 6,013,735 A | 1/2000 | Mishra et al. | |
| 6,201,099 B1 * | 3/2001 | Petersen | C07C 323/52 528/364 |
| 6,433,028 B1 | 8/2002 | Ebbrecht et al. | |
| 7,049,273 B2 | 5/2006 | Esche, Jr. et al. | |
| 7,407,918 B2 | 8/2008 | Mishra et al. | |
| 8,299,002 B2 | 10/2012 | Glasgow et al. | |
| 8,778,857 B2 | 7/2014 | Growcott | |
| 8,835,367 B2 | 9/2014 | Baum et al. | |

(Continued)

FOREIGN PATENT DOCUMENTS

| | | |
|---|---|---|
| EP | 0569639 A1 | 11/1993 |
| WO | 2000029495 A1 | 5/2000 |
| WO | 2015017068 A1 | 2/2015 |

OTHER PUBLICATIONS

Chisholm, M. S., et al., "Facile and cost-effective branched acrylic copolymers from multifunctional comonomers and multifunctional chain transfer agents," Polymer Chemistry, 2015, 6, 7333-7341.

(Continued)

*Primary Examiner* — James C Goloboy
(74) *Attorney, Agent, or Firm* — Honigman Miller Schwartz and Cohn LLP

(57) ABSTRACT

The present disclosure relates to star polymers and, in some approaches, star polymers suitable for use as viscosity index improvers in lubricating oil compositions. The present disclosure further relates to oil compositions comprising such polymers. The disclosure also relates to star polymer compositions derived from a sulfur functionalized chain transfer agent core and select (meth)acrylate monomers.

17 Claims, 1 Drawing Sheet

◯ = Multi-Functional Chain Transfer Agent Core

S = Sulfur functionality

⟩ = Linear PMA polymer

(56) References Cited

U.S. PATENT DOCUMENTS

| | | | |
|---|---|---|---|
| 9,340,747 | B2 | 5/2016 | Nakao et al. |
| 9,469,825 | B2 | 10/2016 | Tang |
| 2003/0032727 | A1 | 2/2003 | Narayan-Sarathy et al. |
| 2004/0209784 | A1 | 10/2004 | Hardman et al. |
| 2007/0244018 | A1* | 10/2007 | Visger .................. C08F 293/00 508/545 |
| 2010/0167970 | A1 | 7/2010 | Stoehr et al. |
| 2012/0152479 | A1 | 6/2012 | Kondou et al. |
| 2013/0079265 | A1 | 3/2013 | Eisenberg et al. |
| 2013/0229016 | A1 | 9/2013 | Ghahary et al. |
| 2015/0183915 | A1 | 7/2015 | Johnson et al. |
| 2015/0322366 | A1 | 11/2015 | Santucci-Aribert et al. |

OTHER PUBLICATIONS

Yuan, Cui Ming, et al., "Polymerization of methyl methacrylate in the presence of polyfunctional chain transfer agents," Macromol. Chem. Phys. 196, 2905-2913 (1995).

* cited by examiner

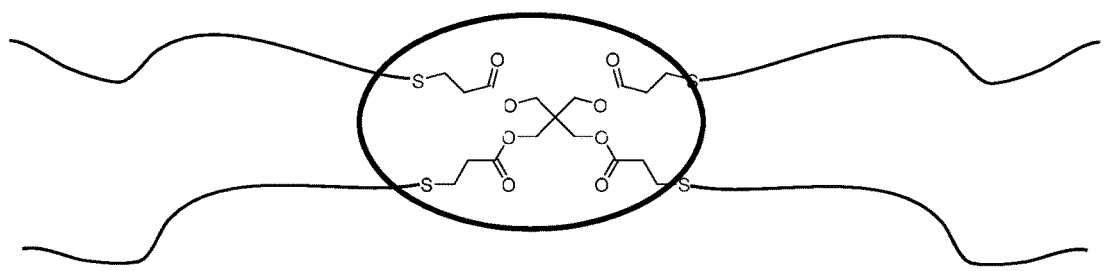
◯ = Multi-Functional Chain Transfer Agent Core
S = Sulfur functionality
⟩ = Linear PMA polymer

POLY (METH)ACRYLATE STAR POLYMERS FOR LUBRICANT ADDITIVE APPLICATIONS

TECHNICAL FIELD

The present disclosure relates to star polymers, and in some approaches, star polymers suitable for use as viscosity index improvers in lubricating oil compositions and further relates to oil compositions comprising such polymers.

BACKGROUND

Mineral or synthetic oil lubricants, such as driveline fluids, engine oils, or automatic transmission fluid (ATF), do not necessarily function the same over wide temperature variations. Such lubricants, for instance, may become less effective at high temperatures because heat reduces their viscosity and film-forming ability. Alternatively, lubricants can also become less effective at cold temperatures as the viscosity of the lubricant increases. This problem is common to many oil lubricants and can be characterized in terms of "viscosity index" (VI), which is an arbitrary measure for the change of viscosity of a lubricating oil with variations in temperature. The lower the VI, the greater the change in viscosity of the oil with temperature changes and vice versa. The viscosity of a lubricant is closely related to its ability to reduce friction. Generally, the least viscous lubricant which still forces two moving surfaces apart is desired. If the lubricant is too viscous, it will require a large amount of energy to move the surfaces; if it is too thin, the surfaces will come in contact and friction will increase. Many lubricant applications, such as lubrication for engine oils, driveline fluids, or automatic transmission fluids, require the lubricant to perform consistently across a wide range of temperatures. However, many lubricants do not inherently have a high enough VI to remain consistent across the wide range of temperatures required by an automobile.

In an attempt to address this shortcoming, a viscosity index improver ("VII") can be added to the lubricant. Viscosity index improvers are commonly polymers, and are added to reduce lubricant viscosity changes at high and low temperatures. When viscosity index improvers are added to low-viscosity oils, they effectively thicken the oil as temperature increases. This means the lubricating effect of mineral oils can be extended across a wider temperature range.

In some instances, automatic transmission fluids (ATF) help with the minimization of shudder (that is, anti-shudder properties), which is believed to be a function of the change of friction coefficient with time ($d\mu/dt<0$) of the transmission. Furthermore, shift characteristics of automatic transmissions are primarily dependent on the frictional characteristics of the ATF. The ATF fluid typically needs to have a high and stable frictional performance over the life of the fluid, good anti-shudder performance, and anti-wear characteristics over a broad temperature range. These characteristics are often a challenge to balance with the requirement that today's ATF lubricant compositions also need to maximize service intervals, or even better, avoid oil service during the lifetime of the equipment. This is referred to in the industry as a lifetime fill or "fill-for-life" fluid. Therefore, maintenance of the friction properties of an ATF over time, i.e. friction durability, may also be a desired property of the fluid.

Several prior efforts at improving the friction properties of lubricating oils have been attempted, including the addition of, or increased levels of, lubricant components such as viscosity index improvers. The addition of or increased levels of components can escalate manufacturing complexity and increase product costs. While poly(meth)acrylate (PMA) additives have been used as VIIs, known examples have advanced structures, rely on advanced technology that drives up the cost of manufacturing, and only have a moderate effect on viscosity index.

BRIEF DESCRIPTION OF THE FIGURE

FIG. 1 is a pictorial representation of star polymers described herein showing one example of a sulfur-functionalized core or chain-transfer agent core and PMA monomer units bonded to the core.

SUMMARY

In one aspect of this disclosure, a poly(meth)acrylate star polymer comprising a polymer of Formula I is provided. In one approach, Formula I is $[(PMA)\text{-}Q\text{-}R_1\text{—}C(O)\text{—}O\text{—}CH_2]_m\text{—}C\text{-}A_n$ (Formula I) wherein the PMA group of Formula I is a polymeric chain including randomly polymerized (meth)acrylate monomer units selected from about 20 to about 35 mole percent short chain alkyl (meth)acrylate monomer units with alkyl chain lengths of 1 to 4 carbons, about 60 to about 80 mole percent long chain alkyl (meth)acrylate monomer units with alkyl chain lengths of 12 to 20 carbons, and optionally about 5 to about 10 mole percent oxygen-functional alkyl (meth)acrylate monomer units with hydroxy alkyl chains including 2 to 7 carbons. Each Q group of Formula I is independently a sulfur atom or an organosulfur group, $R_1$ is an alkylene group of 1 to 10 carbons, and A is hydrogen, an alkyl group, or a group independently selected from Formula A1, A2, or A3:

—O—C(O)—R₁-Q-(PMA)     (Formula A1);

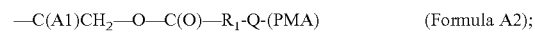

—C(A1)CH₂—O—C(O)—R₁-Q-(PMA)     (Formula A2);

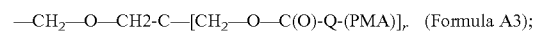

—CH₂—O—CH2-C—[CH₂—O—C(O)-Q-(PMA)]ᵣ     (Formula A3);

In Formula I, m is 0 or an integer from 1 to 4 and if m is less than 4, then A includes at least one group independently selected from the hydrogen, the alkyl group, or the Formulas A1, A2, or A3; n is 0 or an integer from 1 to 4; r within Formula A3 (if used) is an integer from 1 to 3 (if r is less than 3, then the carbon to which the r moieties are bonded may be further substituted with hydrogen(s)). In Formula I, the groups associated with the m integer, A, and the groups associated with the r integer are bonded only to the carbon atom adjacent thereto; and wherein the poly(meth)acrylate star polymer has a weight average molecular weight of about 20 to about 500 Kg/mol and a polydispersity index of greater than 1.1 to about 4.0.

The poly(meth)acrylate star polymer of the preceding paragraph can be combined with a number optional features or embodiments either individually or in combination. For example, the poly (meth)acrylate star polymer of the preceding paragraph may further include wherein Q is sulfur; and/or wherein Q is the organosulfur group and wherein the organosulfur group is selected from

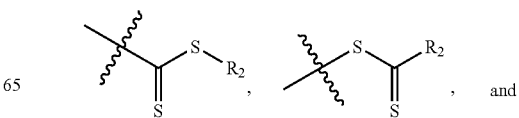

-continued

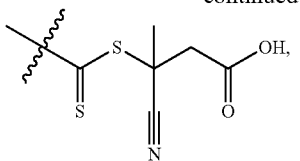

wherein $R_2$ is a $C_1$ to $C_{12}$ alkyl group; and/or wherein the short chain alkyl (meth)acrylate monomers include about 10 to about 30 mole percent of a dispersant monomer; and/or wherein the dispersant monomer is a (meth)acrylate monomer of the formula

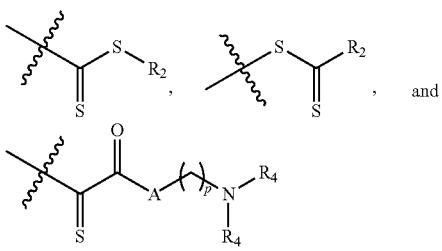

wherein $R_3$ is a hydrogen or methyl, p is an integer from 1 to 6, each $R_4$ is independently a $C_1$ to $C_4$ alkyl group, and A is —O— or —NH—; and/or wherein the polymer exhibits a viscosity index of about 200 or greater; and/or wherein n is 0, m is 4, and Q is sulfur; and/or wherein the oxygen-functional alkyl (meth)acrylate monomers are selected from hydroxy ethyl (meth)acrylate, hydroxy propyl (meth)acrylate, 1-hydroxy propyl (meth)acrylate, 2-hydroxy propyl (meth)acrylate, and combinations thereof.

In another aspect, a poly (meth)acrylate star polymer is described that includes a free radical polymerization (FRP) product of a polyfunctional thiol core and (meth)acrylate monomers wherein the polymerization product has a weight average molecular weight of about 20 to about 500 Kg/mol and a polydispersity index of greater than 1.5 to about 4.0. In one approach or embodiment, the polyfunctional thiol core may be derived or obtained from a reaction product of a tri- to hexa-functional alcohol and a mercaptocarboxylic acid. In one approach or embodiment, the (meth)acrylate monomers include about 20 to about 35 mole percent short chain alkyl (meth)acrylate monomers with alkyl chain lengths of 1 to 4 carbons, about 60 to about 80 mole percent long chain alkyl (meth)acrylate monomers with alkyl chain lengths of 12 to 20 carbons, and optionally about 5 to about 10 mole percent oxygen-functional alkyl (meth)acrylate monomers with hydroxyl alky chains including 2 to 7 carbons.

The poly (meth)acrylate star polymer of the preceding paragraph may also be combined with a number of optional features or embodiments either individually or in combination. For example, the poly (meth)acrylate star polymer of the preceding paragraph may include wherein the tri- to hexa-functional alcohol forming the polyfunctional thiol core is selected from glycerol, pentaerythritol, dipentaerythritol, tripentaerythritol, trimethylolethane, trimethylolpropane, pentahydroxypentane, and mixtures thereof; and/or wherein the mercaptocarboxylic acid is selected from mercaptoacetic acid, mercaptopropionic acid, mercaptobutyric acid, mercaptopentanioc acid, mercaptohexanoic acid, mercaptodecanoic acid, and combinations thereof; and/or wherein the oxygen-functional alkyl (meth)acrylate monomers are selected from hydroxy ethyl (meth)acrylate, hydroxy propyl (meth)acrylate, 1-hydroxy propyl (meth)acrylate, 2-hydroxy propyl (meth)acrylate, and combinations thereof; and/or wherein the weight average molecular weight is about 40 to about 300 Kg/mol; and/or wherein the polymer has a kinematic viscosity at 100° C. of about 50 to about 1500 cSt.

In yet a further aspect, a lubricating oil composition including a star polymer is described. In one approach or embodiment, the lubricating oil composition may include a major amount of a lubricating oil and a viscosity index improving polymer including a poly(meth)acrylate star polymer obtained from the polymerization product of a polyfunctional thiol and (meth)acrylate monomers forming the polymer of Formula I: [(PMA)-Q-$R_1$—C(O)—O—$CH_2]_m$—C-$A_n$ (Formula I). In Formula I, the PMA group is a polymeric chain including randomly polymerized (meth)acrylate monomer units selected from about 20 to about 35 mole percent short chain alkyl (meth)acrylate monomer units with alkyl chain lengths of 1 to 4 carbons, about 60 to about 80 mole percent long chain alkyl (meth)acrylate monomer units with alkyl chain lengths of 12 to 20 carbons, and optionally about 5 to about 10 mole percent oxygen-functional alkyl (meth)acrylate monomer units with hydroxy alkyl chains including 2 to 7 carbons. In Formula I, each Q is independently a sulfur atom or an organosulfur group, $R_1$ is an alkylene group of 1 to 10 carbons, and A is hydrogen, an alkyl group, or a group independently selected from Formula A1, A2, or A3:

—O—C(O)—$R_1$-Q-(PMA)    (Formula A1);

—C(A1)$CH_2$—O—C(O)—$R_1$-Q-(PMA)    (Formula A2);

—$CH_2$—O—CH2-C—[$CH_2$—O—C(O)-Q-(PMA)]$_r$    (Formula A3);

In Formula I, m is 0 or an integer from 1 to 4 and if m is less than 4, then A includes at least one group independently selected from the hydrogen, the alkyl group, or the Formulas A1, A2, or A3; n is 0 or an integer from 1 to 4; and r is an integer from 1 to 3 (if r is less than 3, then the carbon to which the r moieties are bonded may be further substituted with hydrogen(s)); wherein the groups associated with the m integer, A, and the groups associated with the r integer are bonded only to the carbon atom adjacent thereto. In some embodiments, the poly(meth)acrylate star polymer has a weight average molecular weight of about 20 to about 500 Kg/mol. In other embodiments, the lubricating oil composition includes, on an active basis, no more than about 10 weight percent viscosity index improving polymer.

The lubricating oil composition of the preceding paragraph may also be combined with optional features or embodiments either individual or in combination. For example, the lubricating oil composition of the preceding paragraph may further include a thickening VI of the viscosity index improving polymer of about 45 to about 65 viscosity index units per weight percent polymer in the lubricating oil composition; and/or wherein Q is sulfur; and/or wherein Q is the organosulfur group and wherein the organosulfur group is selected from

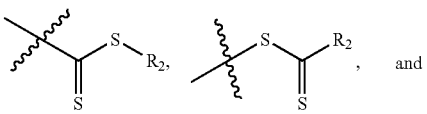

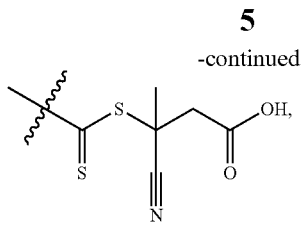

wherein $R_2$ is a $C_1$ to $C_{12}$ alkyl group; and/or wherein the short chain alkyl (meth)acrylate monomers include about 10 to about 30 mole percent of a dispersant monomer; and/or wherein n is 0, m is 4, and Q is sulfur; and/or wherein the weight average molecular weight is about 40 to about 300 Kg/mol; and/or wherein the composition has a viscosity index of about 200 to about 350.

DETAILED DESCRIPTION

The present disclosure describes a new class of poly (meth) acrylate ("PMA") star polymers from a sulfur-functionalized chain transfer agent or core. The star polymer includes a unique combination of PMA monomers or monomer units as side chains or arms extending radially outward from the sulfur-functionalized chain transfer agent core or star center. In one aspect, these star polymers provide improved and high viscosity index (VI) when used as a viscosity index improver (VII) in lubricants and oils due, in some approaches, to the select PMA monomer units in the star polymer arms. The chain transfer agent core has multiple sulfur functionalities, and each preferably has side chains that make the star polymer arms through controlled or conventional free radical polymerization. The star polymers disclosed herein are made using randomly polymerized alkyl (meth)acrylate monomers with the chain transfer agent core providing the center of the polymer. This approach provides better PMA performances with an economically scalable method. These polymers are particularly suited for use in lubricant oil compositions including, but not limited to, driveline fluids, engine oils, automatic transmission fluids, and/or metal working fluids.

The selected monomers to be combined with the sulfur-functionalized chain transfer agent core for the star polymers described herein include alkyl esters of (meth)acrylic acid, and include select amounts of long chain alkyl esters and short chain alkyl esters, optionally in combination with oxygen-functional (meth)acrylate monomers (such as, for example, 2-hydroxyethyl (meth)acrylate ("HEMA" or "HEA")) and/or optional dispersant monomers such as dimethylaminopropyl (meth)acrylate ("DMAPMA") and/or dimethylaminopropyl (meth)acrylamide ("DMAPMAD"). In one approach, the star polymers herein provide PMA polymers with a high viscosity index synthesized by conventional free radical polymerization technology. In other approaches, the polymers herein may also be prepared through advanced polymerization techniques such as reversible addition-fragmentation chain transfer (RAFT) polymerization or atom transfer radical polymerization (ATRP) or multi-step polymerizations. Preferably, the polymers are prepared through conventional free radical polymerization.

The long chain alkyl ester monomers (or monomer units in the polymer) include esters such as lauryl (meth)acrylate ("LMA") and cetyl-eicosyl (meth)acrylate ("CEMA") as those monomers and monomer units are set forth below. The short chain alkyl ester monomers (or monomer units in the polymer) include esters such as methyl (meth)acrylate ("MMA"), ethyl (meth)acrylate, propyl (meth)acrylate, t-butyl (meth)acrylate, and n-butyl (meth)acrylate ("n-BMA"). Optionally, the star polymers of the present invention also include the oxygen-functional alkyl (meth)acrylate monomers, such as hydroxyethyl (meth)acrylate (HEMA or HEA) and/or dispersant monomers, such as dimethylaminopropyl (meth)acrylate (DMAPMA) and/or dimethylaminopropyl (meth)acrylamide (DMAPMAD). As used herein, "(meth)acrylate" refers to both methacrylate and/or acrylate monomers or monomer units (or mixtures) as needed for an application.

High viscosity index PMA star polymers and lubricants herein have improved and consistent performance over a wider temperature range, and therefore can provide benefits to automobiles, such as increasing fuel economy. As stated above, the addition of or increased levels of components can escalate manufacturing complexity and increase product costs; however, the high viscosity index PMA additives herein provide benefits over a wider temperature range (due to the high VI of the polymers) such as but not limited to vehicle fuel economy, particularly in an automatic transmission. In some approaches, these benefits can be achieved with lower treat rates of the VII in the lubricating oil. While PMA additives are known in the art, known examples have advanced structures and rely on advanced technology, which drives up the cost of manufacturing, and prior PMA additives also have limited ability to achieve high VI improvement or may require higher treat rates to achieve similar results. The PMA VIIs of the present disclosure, on the other hand, provide a simpler and less costly random star copolymer technology preferably made through conventional free radical polymerization and achieve even higher VI than prior polymers through a unique selection of monomer relationships. That is, the star PMA viscosity index improvers disclosed herein comprise mixtures of long chain alkyl (meth)acrylate monomer units, short chain alkyl (meth) acrylate monomer units, optionally dimethylaminopropyl (meth)acrylate (DMAPMA) and optionally 2-hydroxyethyl (meth)acrylate (HEMA or HEA) monomer units in select amounts and ratios extending from a chain transfer agent core or multi-functionalized sulfur polymer core. The present disclosure further includes PMA star polymers (and lubricant oils containing such polymers) comprising novel combinations of the monomers or monomer units described herein, which provide a surprisingly and unexpectedly high viscosity index relative to other PMA VII's known in the art.

As discussed more below, while the primary long chain functionality of the PMA star polymers of the present disclosure is lauryl (meth)acrylate or LMA monomer units, these long chain functionalities can also include longer chains, such as cetyl-eicosyl (meth)acrylate or CEMA monomer units. Similarly, while the primary short chain functionality of the PMA star polymers of the present disclosure is methyl (meth)acrylate or MMA monomer units, these short chain functionalities can also include other short chains, such as ethyl (meth)acrylate, propyl (meth) acrylate, t-butyl (meth)acrylate, and n-butyl (meth)acrylate or n-BMA monomer units. When present in the PMA star polymers of the present disclosure, the abundance of CEMA is typically no more than about 10 mole percent (in other approaches, less than about 7.5 mole percent and in yet other approaches no more than about 5 mole percent) relative to all PMA monomers or monomer units. When present in the PMA star polymers of the present disclosure, the abundance of DMAPMA and/or DMAPMAD is typically no more than about 10 mole percent (in other approaches less than about 7.5 mole percent and in yet other approaches, no more than about 5 mole percent) relative to all PMA monomers or monomer units.

Additionally, the PMA star polymers of the present disclosure are typically free of monomers and monomer units with intermediate alkyl chain length functionalities having carbon chain lengths of 5 to 9 carbons. As used herein, "free of" generally means less than about 0.5 mole percent, in other approaches, less than about 0.25 mole percent, in other approaches, less than about 0.1 mole percent, and, in other approaches none (again, relative to the PMA monomers or monomer units).

The PMA star polymers are typically synthesized to have a weight average molecular weight of at least 10 kg/mole, in other approaches, at least about 100 kg/mole, in other approaches, at least about 150 kg/mole, and in yet another approaches, at least about 200 kg/mole. In other embodiments, the PMA star polymers are synthesized to have a weight average molecular weight of up to about 600 kg/mole, in other approaches, about 10 to about 600 kg/mole, in other approaches, about 150 to about 600 kg/mole, and in yet other approaches, about 200 to about 600 kg/mole. In yet other embodiments, the PMA star polymers may also have weight average molecular weights of about 10 to about 50 kg/mole, in other approaches, about 50 to about 100 kg/mole, in other approaches, about 100 to about 400 kg/mole, in other approaches, about 150 to about 400 kg/mole, and in yet further approaches, about 200 to about 400 kg/mole.

The present disclosure also includes a lubricant oil composition or additive concentrate comprising a base oil and at least a PMA star polymer as discussed herein as a viscosity index improver (VII). The PMA star polymers are typically present in the lubricant oil compositions in about 1 to about 20 weight percent (in other approaches, about 1 to about 15 weight percent, and in yet further approaches, about 1 to about 10 weight percent) when used as a viscosity index improver. As used herein, the weight percent of the PMA star polymers refers to the weight percent of the polymer solids in the lubricating oil and not any carrier oil or other diluent commonly associated with such polymers when added to the lubricating oil compositions (that is, in an oil free basis).

As used herein and unless the context suggests otherwise, an "alkyl" group refers to a saturated aliphatic hydrocarbon or hydrocarbyl group containing 1 to 8 (e.g., 1 to 6 or 1 to 4) carbon atoms. An alkyl group can be straight or branched. Examples of alkyl groups include, but are not limited to, methyl, ethyl, propyl, isopropyl, butyl, isobutyl, sec-butyl, isobutyl, n-pentyl, n-heptyl, or 2-ethylhexyl. An alkyl group can be optionally substituted with one or more substituents as described herein.

As used herein, an "alkylene" group refers to a bivalent saturated alkyl group, e.g. "an alkyl linker". Examples of alkylenes include, but are not limited to methylene, ethylene, propylene, isopropylene, and butylene.

As used herein, a "mercapto" group refers to —SH, and is synonymous with "thiol".

As used herein, an "organosulfur" group refers to any organic compound that contains a sulfur atom.

As used herein, an "organonitrogen" group refers to any organic compound that contains a nitrogen atom. "Organonitrogen" can also be used to describe a more specific chemical moiety, such as an "organonitrogen (meth)acrylate monomer" of the disclosure, wherein an "organonitrogen (meth)acrylate monomer" is a nitrogen containing monomer.

As used herein, the term "hydrocarbyl group" or "hydrocarbyl" is used in its ordinary sense, which is well-known to those skilled in the art. Specifically, it refers to a group having a carbon atom directly attached to the remainder of a molecule and having a predominantly hydrocarbon character. Examples of hydrocarbyl groups include: (1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical); (2) substituted hydrocarbon substituents, that is, substituents containing non-hydrocarbon groups which, in the context of the description herein, do not alter the predominantly hydrocarbon substituent (e.g., halo (especially chloro and fluoro), hydroxyl, alkoxy, mercapto, alkyl mercapto, nitro, nitroso, amino, alkylamino, and sulfoxy); (3) hetero-substituents, that is, substituents, which, while having a predominantly hydrocarbon character, in the context of this description, contain other than carbon in a ring or chain otherwise composed of carbon atoms. Hetero-atoms include sulfur, oxygen, nitrogen, and encompass substituents such as carbonyl, amido, imido, pyridyl, furyl, thienyl, ureyl, and imidazolyl. In general, no more than two, or as a further example, no more than one, non-hydrocarbon substituent will be present for every ten carbon atoms in the hydrocarbyl group; in some embodiments, there will be no non-hydrocarbon substituent in the hydrocarbyl group.

As used herein, the term "major amount" is understood to mean an amount greater than or equal to 50 wt. %, for example from about 80 to about 98 wt. % relative to the total weight of the composition. Moreover, as used herein, the term "minor amount" is understood to mean an amount less than 50 wt. % relative to the total weight of the composition.

Turning to more of the specifics and in one aspect, the PMA star polymers herein are a random polymerization reaction product of an sulfur-functionalized chain transfer agent or core and select (meth)acrylate monomers forming polymerized star arms extending from the thiol functionality of the core. The star polymers of the various embodiments herein may have at least 3 arms and up to 12 arms, in other approaches 3 to 6 arms, and in yet further approaches 3 to 4 arms.

In some approaches, the PMA star polymers include the polymer or structure of Formula I

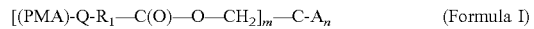
[(PMA)-Q-R$_1$—C(O)—O—CH$_2$]$_m$—C-A$_n$   (Formula I)

wherein PMA represents a polymeric chain including randomly polymerized (meth)acrylate monomer units including from about 20 to about 35 mole percent short chain alkyl (meth)acrylate monomer units with alkyl chain lengths of 1 to 4 carbons, about 60 to about 80 mole percent long chain alkyl (meth)acrylate monomer units with alkyl chain lengths of 12 to 20 carbons, and optionally about 5 to about 10 mole percent oxygen-functional alkyl (meth)acrylate monomer units with hydroxy alkyl chains including 2 to 7 carbons. Each Q of Formula I is independently a sulfur atom or an organosulfur group and R$_1$ is a substituted or unsubstituted linking or alkylene group of 1 to 10 carbons.

In Formula I, the A group is independently selected from a hydrogen, an alkyl group, or a group independently selected from Formula A1, A2, or A3 (with PMA, R$_1$ and Q as defined above):

—O—C(O)—R$_1$-Q-(PMA)   (Formula A1);

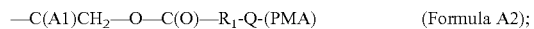
—C(A1)CH$_2$—O—C(O)—R$_1$-Q-(PMA)   (Formula A2);

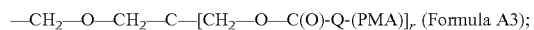
—CH$_2$—O—CH$_2$—C—[CH$_2$—O—C(O)-Q-(PMA)]$_r$  (Formula A3);

In Formula I, m is 0 or an integer from 1 to 4 and if m is less than 4, then A includes at least one group independently selected from the hydrogen, the alkyl group, or the Formulas A1, A2, or A3; n is 0 or an integer from 1 to 4; and r in Formula A3 is an integer from 1 to 3 (if r is less than 3, then the carbon to which the r moieties are bonded may be further substituted with hydrogen(s)). In some approaches of the embodiments herein, m+n equals 4

To form the star polymer, the groups associated with the m integer, the A groups, and the groups associated with the r integer are bonded to the carbon atom adjacent thereto as described and shown more fully below. In some approaches, the poly(meth)acrylate star polymer has a weight average molecular weight of about 20 to about 500 Kg/mol and a polydispersity index of greater than 1.1 to about 4.0.

The select (meth)acrylate monomers (or monomer/repeating units in the resulting polymer) for the PMA groups of Formula I include at least the (meth)acrylate monomers of Formula II and Formula III Formula II and Formula III

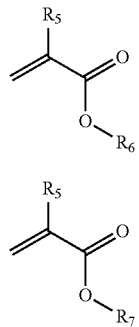

Formula II

Formula III wherein $R_5$ is a hydrogen if the monomer or repeating unit thereof is an acrylate or $CH_3$ if the monomer or repeating unit thereof is methacrylate, $R_6$ is a short chain alkyl or hydrocarbyl group having 1 to 4 carbon atoms; and $R_7$ is a long chain alkyl or hydrocarbyl group having 12 to 20 carbon atoms. In some approaches, the (meth)acrylate monomers or monomer units include about 20 to about 35 mole percent of the short chain alkyl (meth)acrylate monomers or monomer units of Formula II and about 60 to about 80 mole percent of the (meth)acrylate monomers or monomer units are long chain alkyl monomers of Formula III (that is, relative to all PMA monomers or monomer units in the side chains). In other approaches and as discussed more below, the (meth)acrylate monomers or monomer units may further include about 5 to about 10 mole percent of oxygen-functional alkyl (meth)acrylates such as hydroxyethyl (meth)acrylate (HEMA or HEA) monomers (again, relative to the total PMA monomers or monomer units).

In some approaches, the reaction product is produced in a reaction medium. The reaction medium may further include a diluent oil. The weight percent of the reaction product (that, the PMA star polymer) in the reaction medium may be from about 30 weight percent to about 60 weight percent (for example, from about 40 percent to about 50 weight percent). In a further embodiment, the weight percent of the reaction product in the reaction medium is about 40 percent. In another further embodiment, the weight percent of the reaction product in the reaction medium is about 50 percent. Typically, the remainder of the reaction product is diluent oil.

Star Polymer

In one aspect, the present disclosure includes a star polymer that, in some approaches, is a polymer suitable for a viscosity index improver (VII) in lubricating oil compositions or applications. The polymer includes the reaction product in the form of a star polymer structure including select amounts of both long and short chain alkyl (meth)acrylate monomers, optionally combined with oxygen-functional alkyl (meth)acrylate monomers (such as 2-hydroxyethyl (meth)acrylate) and/or aminic monomers (such as dimethylaminopropyl (meth)acrylate monomers), randomly polymerized as arms extending from a multi-thiol functional chain transfer agent core. In some approaches, the star polymers herein may have at least 3 arms and up to 12 arms, but more preferably, the star polymer has 3 to 6 arms, and in other approaches, 3 to 4 arms.

In one approach, the polymer stems from a chain-transfer agent core having 4 thiol functional sites. In this approach, the star polymer may have the structure of Formula IV or Formula V below including a core derived from either penta-erythritol or erythritol, respectively (PMA, Q, and $R_1$ as previously described):

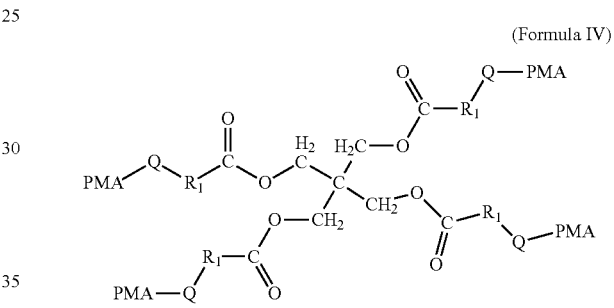

(Formula IV)

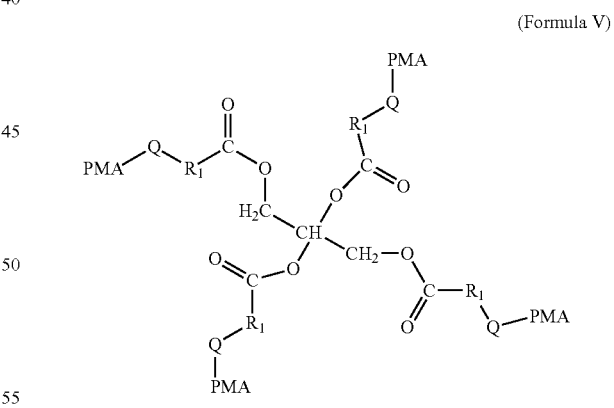

(Formula V)

The star polymer, in other approaches, may also include a chain-transfer agent core having 3 thiol functional sites. In this approach, the star polymer may have the structure of Formula VI or VII below including a core derived from glycerol, tri-methylol ethane or propane wherein $R_8$ is an alkyl chain having 1 to 4 carbons (PMA, Q, and $R_1$ as above):

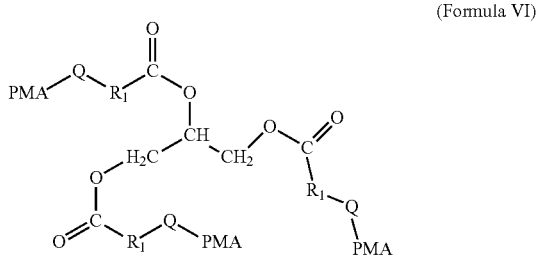

(Formula VI)

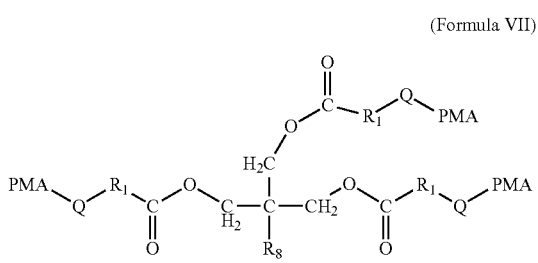

(Formula VII)

The star polymer, in yet other approaches, may include a chain transfer agent core having 6 thiol functional sites. In this approach, the star polymer may have the structure of Formula VIII below and include a core derived from di-penta erythritol (PMA, Q, and $R_1$ as previously described):

transfer agent cores are derived from or include the reaction product of a tri- to hexa-functional alcohol and mercapto-carboxylic acid. The tri- to hexa-functional alcohol may be selected, for example, from glycerol, erythritol, pentaerythritol, dipentaerythritol, tri-methylolethane, trimethylolpropane, mixtures thereof, and the like alcohols. The mercaptocarboxylic acid may be selected from, for example, mercaptoacetic acid, mercaptopropionic acid, mercaptobutyric acid, mercaptopentanioc acid, mercaptohexanoic acid, mercaptodecanoic acid, and combinations thereof.

In some approaches, the chain transfer agent core may include a compound of Formula IC as shown below:

$$[Q\text{-}R_1\text{---}C(O)\text{---}O\text{---}CH_2]_m\text{---}C\text{-}A'_n \qquad \text{(Formula 1C)}$$

wherein Q, $R_1$, and m and n are as described above and A' is hydrogen, an alkyl group, or a group independently selected from Formulas A1, A2, or A3 without the PMA monomers thereon.

In other approaches, the chain transfer agent core is selected from the following multi-functional thiol compounds with Q shown being a thiol and $R_1$ shown being ethylene (of course, Q and $R_1$ may be other moieties as discussed herein):

(Formula VIII)

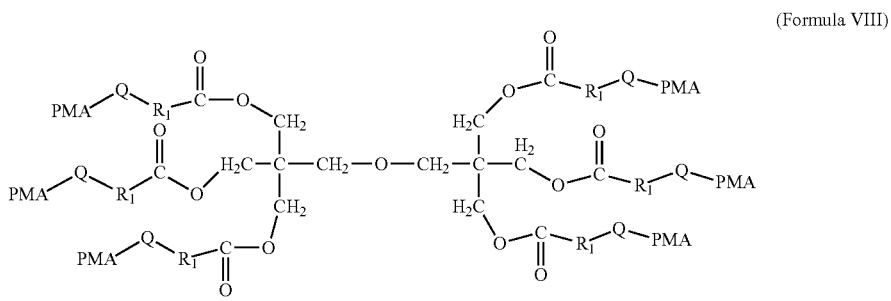

The star polymer may have other structures consistent with Formula I. The additional formulas above are merely examples of possible star polymers of the present disclosure.

The star polymer of Formula I (and the other Formulas IV through VIII) may have a weight average molecular weight from about 20 to about 500 kg/mol (for example, from about 40 to about 400 kg/mol, from about 40 to about 300 kg/mol, or from about 100 to about 300 kg/mol). In yet further approaches, the polymer of Formula I has a weight average molecular weight of about 40 to about 500 kg/mole; in other approaches, about 100 to about 500 kg/mole; and in yet further approaches, about 200 to about 500 kg/mole. In further embodiment, the star polymer of Formula I has a weight average molecular weight of about 45, about 115, about 165, or about 215 kg/mol.

The Chain Transfer Agent Core:

The center or core forming the star polymers herein include chain transfer agent cores having multiple thiol functionalities or bonding sites for the PMA monomer units as further discussed below. In one approach, the chain

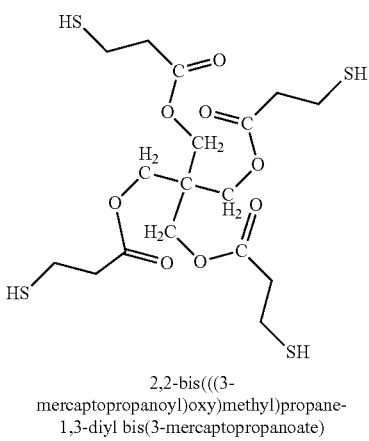

2,2-bis(((3-mercaptopropanoyl)oxy)methyl)propane-1,3-diyl bis(3-mercaptopropanoate)

-continued

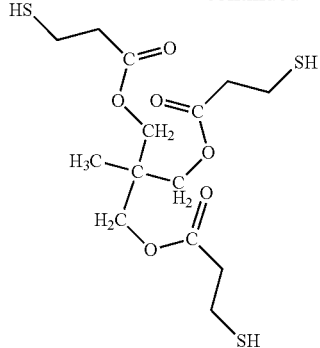

2-(((3-mercaptopropanoyl)oxy)methyl)-2-methylpropane-1,3-diyl bis(3-mercaptopropanoate)

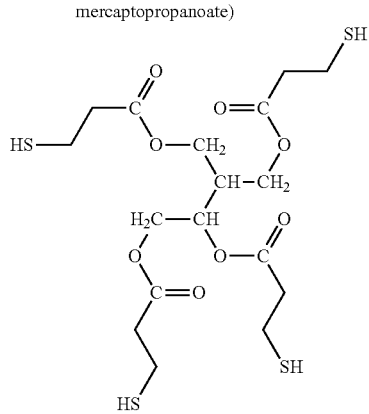

3-(((3-mercatopropanoyl)oxy)methyl)butane-1,2,4-triyl tris(3-mercaptopropanoate)

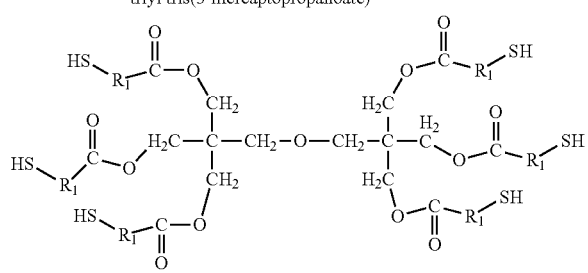

Wherein the above formula is derived from di-penta erythritol

Wherein the above formula is derived from di-penta erythritol

Each sulfur functionality represented by "Q" in Formula I provides a chain transfer point for conventional or controlled free radical polymerization of the short chain, long chain, and other optional monomers (e.g., HEMA, DMAPMA, and/or DMAPMAD monomers) as discussed herein. If conventional free radical polymerization is used, the Q group is preferably a mercapto group and the reaction medium may include a radical (or polymerization) initiator. In a further embodiment, the radical initiator may be Vazo™ 67 (2.2'-Azobis(2-methylbutyronitrile)) or the like radical initiator.

If more complex polymerization methods are used, such as RAFT, the Q group may be an appropriate RAFT initiator, portion of a RAFT chain transfer agent, or an analog of a RAFT agent that is attached to the PDAS polymer backbone. Examples of a suitable RAFT chain transfer agents, portions thereof, or analog's thereof that may be suitable for Q include benzyl 1-(2-pyrrolidinone) carbodithioate, benzyl (1,2-benzene dicarboximido) carbodithioate, 2-cyanoprop-2-yl 1-pyrrolecarbodithioate, 2-cyanobut-2-yl 1-pyrrole carbodithioate, benzyl 1-imidazole carbodithioate, N,N-dimethyl-S-(2-cyanoprop-2-yl)dithiocarbamate, N,N-diethyl-S-benzyl dithio carbamate, cyanomethyl 1-(2-pyrrolidone) carbodithoate, cumyl dithiobenzoate, 2-dodecylsulphanylthiocarbonylsulphanyl-2-methyl-propionic acid butyl ester, O-phenyl-S-benzyl xanthate, N,N-diethyl S-(2-ethoxy-carbonyl prop-2-yl)dithiocarbamate, dithiobenzoic acid, 4-chlorodithiobenzoic acid, O-ethyl-S-(1-phenylethyl)xanthtate, O-ethyl-S-(2-(ethoxycarbonyl)prop-2-yl)xanthate, O-ethyl-S-(2-cyanoprop-2-yl)xanthate, O-ethyl-S-(2-cyanoprop-2-yl)xanthate, O-ethyl-S-cyanomethyl xanthate, O-pentafluorophenyl-S-benzyl xanthate, 3-benzylthio-5,5-dimethylcyclohex-2-ene-1-thione or benzyl 3,3-di(benzylthio)prop-2-enedithioate, S,S'-bis-([alpha],[alpha]'-disubstituted-[alpha]"-acetic acid)-trithiocarbonate, S,S'-bis-([alpha],[alpha]'-disubstituted-[alpha]"-acetic acid)-trithiocarbonate or S-alkyl-S'-[alpha],[alpha]'-disubstituted-[alpha]"-acetic acid)-trithiocarbonates, benzyl dithiobenzoate, 1-phenylethyl dithiobenzoate, 2-phenylprop-2-yl dithiobenzoate, 1-acetoxyethyl dithiobenzoate, hexakis (thiobenzoyl thiomethyl) benzene, 1,4-bis(thiobenzoylthiomethyl)benzene, 1,2,4,5-tetrakis (thiobenzoylthiomethyl)benzene, 1,4-bis-(2-(thiobenzoylthio)-prop-2-yl) benzene, 1-(4-methoxyphenyl)ethyl dithiobenzoate, benzyl dithioacetate, ethoxycarbonylmethyl dithioacetate, 2-(ethoxycarbonyl)prop-2-yl dithiobenzoate, 2,4,4-trimethylpent-2-yl dithiobenzoate, 2-(4-chlorophenyl)prop-2-yl dithiobenzoate, 3-vinylbenzyl dithiobenzoate, 4-vinylbenzyl dithiobenzoate, S-benzyl diethoxyphosphinyldithioformate, tert-butyl trithioperbenzoate, 2-phenylprop-2-yl 4-chlorodithiobenzoate, 2-phenylprop-2-yl 1-dithionaphthalate, 4-cyanopentanoic acid dithiobenzoate, dibenzyl tetrathioterephthalate, dibenzyl trithiocarbonate, carboxymethyl dithiobenzoate or poly(ethylene oxide) with dithiobenzoate end group or mixtures thereof. In one embodiment a suitable RAFT chain transfer agent for Q includes 2-dodecyl sulfanylthiocarbonylsulfanyl-2-methyl-propionic acid butyl ester, cumyl dithiobenzoate or mixtures thereof For instance, when RAFT polymerization is used, the Q group is the organosulfur group, and may be selected from

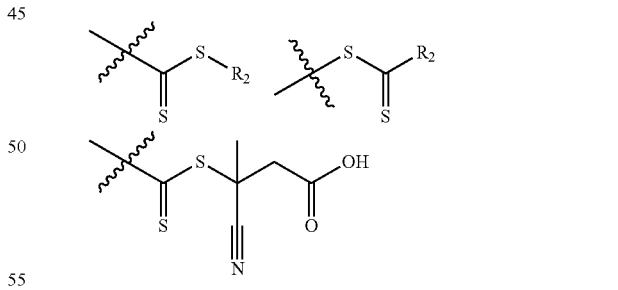

wherein $R_2$ is a primary, secondary, or tertiary $C_1$ to $C_{12}$ alkyl group or hydrocarbyl group (optionally including a radical stabilizing functionality, such as, cyano or ester groups at the a position of the $R_1$ chain). Within the structures herein, the wavy lines illustrates the attachment point to the core of Formula I.

Short Chain Alkyl (Meth)Acrylate Monomers or Monomer Units:

In one embodiment, the (meth)acrylate monomers may include about 10 to about 40 mole percent of the short chain alkyl (meth)acrylate monomers or monomer units, in other approaches, about 15 to about 30 mole percent, and in yet other approaches, about 20 to about 35 mole percent of the short chain alkyl (meth)acrylate relative to the total amount of side chain or arm monomer units. The short chain alkyl (meth)acrylate monomers or monomer units include those with an alkyl chain length of 1-4 carbon atoms and include, for example, methyl(meth)acrylate and n-butyl (meth)acrylate as shown in the structures below:

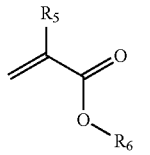

(Formula II)

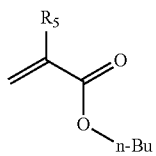

n-BMA

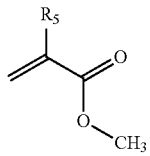

MMA where $R_5$ is a hydrogen if the monomer or monomer unit is an acrylate and a methyl or $CH_3$ if the monomer or monomer unit is a methacrylate and $R_6$ is a $C_1$ to $C_4$ carbon or hydrocarbyl chain. Also shown above are n-butyl (meth)acrylate (n-BMA) and methyl (meth)acrylate (MMA) as exemplary short chain alkyl (meth)acrylate monomers or monomer units. The short chain alkyl (meth)acrylate may also be ethyl, propyl, or t-butyl (meth)acrylate as needed for a particular application. In other approaches, the (meth)acrylate monomers may include at least about 20 mole percent of the short chain alkyl (meth)acrylate, e.g. about 20 mole percent, about 25 mole percent, or about 30 mole percent, combined with the other monomers or units discussed herein.

Long Chain Alkyl (Meth)Acrylate Monomers or Monomer Units:

The (meth)acrylate monomers may also include about 50 to about 85 mole percent of the long chain alkyl (meth)acrylate monomers (in other approaches, about 60 to about 80 mole percent, and in yet further approaches, about 65 to about 75 mole percent) relative to the total amount of side chain or arm monomer units. Long chain alkyl (meth)acrylate monomers are generally described by Formula III below, and include those with an alkyl chain length from 12 to 20 carbons as shown in the structures below and may include lauryl (meth)acrylate or LMA (as defined below) and cetyl-eiosyl (meth)acrylate or CEMA (as defined below):

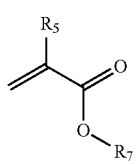

(Formula III)

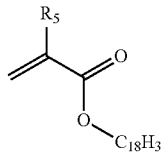

CEMA

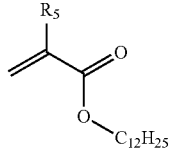

LMA wherein $R_5$ is hydrogen if the monomer or monomer units are acrylate or methyl or $CH_3$ if the monomer or monomer units are methacrylate, and where $R_7$ is a $C_{12}$ to $C_{20}$ alkyl chain. In yet another approach, the (meth)acrylate monomers may include at least about 65 mole percent of the long chain alkyl (meth)acrylate monomer or repeating units thereof (in other approaches, about 65 mole percent, about 70 mole percent, or about 75 mole percent).

As shown above, the long chain alkyl (meth)acrylate monomer or monomer units may include lauryl (meth)acrylate or LMA. Lauryl (meth)acrylate as used herein, in some approaches, includes a blend of (meth)acrylate monomers or monomer units having alkyl chain lengths ranging from $C_{12}$ to $C_{15}$ and, in particular, alkyl chains of 12, 14, and 15 carbons in the blend. For example, the LMA or LMA blend may include a majority of alkyl (meth)acrylate monomers or monomer units with $C_{12}$ chains and further including minor amounts of monomers or monomer units with $C_{14}$ and $C_{15}$ chains mixed in a blend. In one approach, the LMA may include about 67 to about 75 mole percent alkyl (meth)acrylate with $C_{12}$ alkyl chains (in other approaches, about 69 to about 75 mole percent $C_{12}$ chains) and also include about 24 to about 30 mole percent alkyl (meth)acrylate with $C_{14}$ alkyl chains (in other approaches, about 25 to about 29 $C_{14}$ chains) and about 0 to about 3 mole percent alkyl (meth)acrylate with $C_{15}$ alkyl chains (in other approaches, about 1 to about 2 mole percent $C_{15}$ alkyl chains). Unless stated otherwise, when this disclosure refers to LMA or lauryl (meth)acrylate, the blend of the above monomers or monomer units is intended and all monomers in the blend will be randomly polymerized in their respective amounts as random monomer units or random repeating into the chain transfer agent core.

The long chain alkyl (meth)acrylate monomers or monomer units may also include cetyl-eicosyl (meth)acrylate or CEMA. Cetyl-eicosyl (meth)acrylate as used herein, in some approaches, includes a blend of (meth)acrylate monomers or monomer units having alkyl chain lengths ranging from $C_{16}$ to $C_{20}$ and in particular 16, 18, and 20 carbons. For example, the CEMA monomer blend or monomer unit blend may include a majority of $C_{16}$ and $C_{18}$ chains with minor amounts of $C_{20}$ chains. For simplicity herein, the CEMA monomer or monomer units may be referred to as an alkyl (meth)acrylate monomer or monomer unit with $C_{18}$ alkyl chains even though it may contain a majority of $C_{16}$ and/or $C_{18}$ alkyl chains. In one approach, the CEMA monomer may include about 29 to about 36 mole percent alkyl (meth)acrylate with $C_{18}$ alkyl chains (in other approaches, about 30 to about 35 mole percent $C_{18}$ chains) and also include about 46 to about 54 mole percent alkyl (meth)acrylate with $C_{16}$ alkyl chains (in other approaches, about 47 to about 53 mole percent $C_{16}$ chains) and about 9 to about 17 mole percent alkyl (meth) acrylate with $C_{20}$ alkyl chains (in other approaches, about 10 to about 16 mole percent $C_{20}$ chains). In some approaches, the CEMA may also include up to about 4.5 mole percent of (meth)acrylate with alkyl chains shorter than $C_{16}$ and up to 3 mole percent of alkyl chains greater than $C_{20}$. Unless stated otherwise, when this disclosure refers to CEMA or cetyl-eiosyl (meth)acrylate, the blend of the above monomers or monomer units is intended and all monomers in the blend are randomly polymerized in their respective amounts as random monomer units or random repeating units into the polymer.

Oxygen-Functional Alkyl (Meth)Acrylate Monomers or Monomer Units:

In some approaches, the polymers herein include oxygen-functional alkyl (meth)acrylate monomers or monomer units. In some approaches, the oxygen-functional alkyl (meth)acrylate monomers are selected from hydroxy ethyl (meth)acrylate (HEMA OR HEA), hydroxy propyl (meth)acrylate, 1-hydroxy propyl (meth)acrylate, 2-hydroxy propyl (meth)acrylate, ethoxy ethyl (meth)acrylate, ethoxy propyl (meth)acrylate; diethylene glycol methyl ether (meth)acrylate, triethylene glycol monoethylether (meth)acrylate, and combinations thereof.

In other approaches, the oxygen-functional monomer is HEMA (2-hydroxyethyl methacrylate) or HEA (2-hydroxyethyl acrylate) or a hydroxyester (meth)acrylate having the structure shown below:

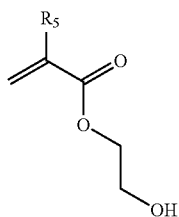

wherein $R_5$ is hydrogen if the monomer or monomer unit is an acrylate or is a methyl ($CH_3$) if the monomer or monomer unit is a methacrylate. In one approach, the (meth)acrylate monomers or monomer units includes from 0 to about 10 mole percent of HEMA or HEA or other oxygen-functional alkyl (meth)acrylate, in other approaches, about 5 to about 10 mole percent relative to the total amount of side chain or arm monomer units. In other approaches, the short chain alkyl (meth)acrylate monomers may include about 10 to about 30 mole percent of HEMA or HEA or other oxygen-functional monomer or monomer units.

Polymerization:

During polymerization and in some approaches, the above described monomers in the reaction mixture react with free radicals on the sulfur functionalities of the star polymer core or chain transfer agent core/center (e.g., the Q moiety), and then [or simultaneously] randomly form carbon-carbon bonds at the monomer olefin functionality to preferably form linear, random polymers bonding to the sulfur functionality to form star arms extending from the polymer core. These preferred linear polymers (PMAs) extend outward from the sulfur functionalities of the core, with repeating units or monomer units of carbon chains (PMA) having functional moieties or side chains consistent with the concentrations of the monomers in the original reaction mixture. The monomer units or repeating units are randomly polymerized into the side chains extending from the sulfur functionality.

Polymerizations of the present disclosure can be accomplished using various types of reactions, such as conventional free radical polymerization (FRP) or reversible addition-fragmentation chain transfer polymerization (RAFT) to suggest a few methods of formation. However, an advantage of the present disclosure is that conventional FRP can be used, which is less technologically demanding and more economical than other types of polymerizations. In one aspect, the polymerization of the present disclosure can form a reaction product of a random star polymer generally represented by FIG. 1 and the general structure below of Formula I:

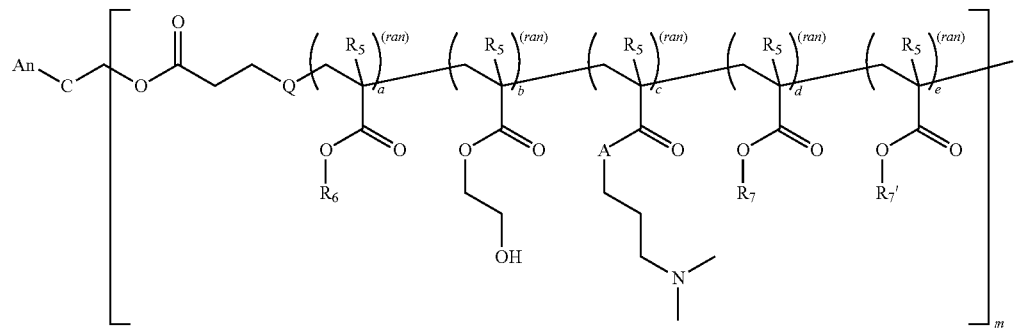

wherein $R_1$ in the above formula is a C2 hydrocarbon chain (but may be any R1 as defined above), a is an integer sufficient to provide about 20 to about 35 mole percent of the short chain alkyl (meth)acrylate monomer or repeating units; b is an integer to provide about 0 to about 10 mole percent of the HEMA or HEA monomer or repeating units (or other oxygen-functional monomer as described herein), c is an integer to provide about 0 to about 10 mole percent of the aminic monomer or repeating units (DMAPMA or DMAPMAD, but may be any of the aminic monomer units described herein), d is an integer to provide about 60 to about 80 mole percent of long chain alkyl (meth)acrylate monomer or repeating units with $R_7$ being a C12 to C15 carbon chain, and e is an integer to provide about 0 to about 10 mole percent of long chain alkyl (meth)acrylate monomer or repeating units with $R_{7'}$ being a C16 to C20 carbon chain. The associated moieties or groups of integers a, b, c, d, and e are randomly polymerized as the side chains or star arms of the polymer. While the structure shows the "a" group bonded to the Q moiety, any of the a, b, c, d, or e groups may be randomly bonded to the Q moiety or sulfur thereof. The variables m and n are integers as described above and the other variables in the above Formula are as described previously.

In one embodiment of this aspect, the PMA functionalities forming the side chains or arms of the star polymers herein are linear (meth)acrylate polymers including any combination of, the long and short chain alkyl (meth)acrylate monomers discussed herein and optionally, the HEMA or HEA (or other oxygen-functional alkyl (meth)acrylate), and/or aminic monomers. In another embodiment, the long chain (meth)acrylate monomers are selected from LMA and CEMA monomers, or combinations thereof. In another embodiment, the short chain (meth)acrylate monomers are selected from n-BMA and MMA monomers, or combinations thereof. In a further embodiment, the short chain (meth)acrylate monomers are MMA monomers.

In one embodiment, the PMA functionalities of the star polymers of the present disclosure are linear (meth)acrylate polymers comprising from about 50 to about 90 mole percent long chain monomers, about 10 to about 40 mole percent short chain monomers, 0 to about 20 mole percent HEMA or HEA, and 0 to about 10 mole percent DMAPMA or DMAPMAD. In another embodiment, the PMA functionalities of the star polymers of the present invention are linear (meth)acrylate polymers comprising from 60 to about 80 mole percent long chain monomers, 20 to about 35 mole percent short chain monomers, 0 to about 20 mole percent HEMA or HEA, and 0 to about 10 mole percent DMAPMA or DMAPMAD. In another embodiment, the PMA functionalities of the star polymers of the present invention are linear (meth)acrylate polymers comprising from 65 to about 75 mole percent long chain monomers, 20 to about 30 mole percent short chain monomers, 0 to about 10 mole percent HEMA or HEA, and 0 to about 5 mole percent DMAPMA or DMAPMAD.

As used herein, "monomer" generally refers to the compound within the reaction mixture prior to polymerization and monomer units or (alternatively) repeating units refers to the monomer as polymerized within the polymeric backbone or, in the case of the star polymers herein, within the side chain arms. As noted, the various monomers herein are randomly polymerized within the side chains or arms as the monomer units or repeating units. If the discussion refers to a monomer, it also implies the resultant monomer unit or repeating unit thereof in the polymer or side chain arm. Likewise, if the discussion refers to a monomer unit or repeating unit, it also implies the monomer mixture used to form the polymer with the associated monomer or repeating units therein.

In one embodiment, the reaction product or the star polymer of the present disclosure has a weight average molecular weight of at least about 10 kg/mole, in other approaches, at least about 100 kg/mole, in other approaches, at least about 150 kg/mole, and in yet other approaches at least about 200 kg/mole. The polymer may also have a weight average molecular weight ranging from about 10 kg/mole to about 600 kg/mole, in other approaches, about 10 kg/mole to about 50 kg/mole, in yet further approaches, about 50 to about 100 kg/mole, in further approaches, about 100 kg/mole to about 600 kg/mole; in other approaches, about 150 kg/mole to about 600 kg/mole, and in yet other approaches, about 200 to about 500 kg/mole.

The various star polymer embodiments of the present disclosure may also have a polydispersity index (PDI) of about 1.0 to about 4.5, in other approaches, about 1.1 to about 4.0, in other approaches, about 1.5 to about 4.0, in yet other approaches, about 1.5 to about 3.7. If conventional free radical polymerization is used, the PDI may be about 1.5 to about 4.0.

In one embodiment, the alkyl (meth)acrylate monomers or monomer units of the PMA functionalities of the star polymers of the present disclosure include both methyl (meth)acrylate and lauryl (meth)acrylate and the polymer may include side chains with up to about 95 mole percent (in other approaches, up to 90 mole percent) of the methyl (meth)acrylate monomer units and the lauryl (meth)acrylate monomer units combined. In other approaches, the side chains may include from about 75 mole percent to about 95 mole percent (e.g. 75 mole percent, 77.5 mole percent, 80 mole percent, 82.5 mole percent, 85 mole percent, 88.3 mole percent, and 90 mole percent) of the methyl (meth)acrylate and the lauryl (meth)acrylate combined).

In another embodiment, the alkyl (meth)acrylate monomer units of the PMA functionalities of the star polymers of the present invention further include no more than about 7.5 mole percent (in other approaches, about 0 to about 7.5 mole percent, about 2 to about 7.5 mole percent, about 2 to about 5 mole percent, about 3.3 mole percent, or about 5 mole percent) of the longer chain alkyl (meth)acrylates monomer units having an average alkyl chain length of 16 to 20 carbons.

In another embodiment, the alkyl (meth)acrylate monomer units of the PMA functionalities of the star polymers of the present invention further include no more than about 12.5 mole percent (in other approaches, about 0 to about 12.5 mole percent, about 0 to about 7.5 mole percent, about 5 mole percent, or about 10 mole percent) of hydroxyethyl (meth)acrylate (HEMA or HEA) monomers.

Dispersant Monomer and Other Monomer Units:

The star polymers herein may optionally be functionalized with other monomers and monomer units including (meth)acrylic and one or more aminic or dispersant monomer or monomer units. For example, the (meth)acrylate monomers or monomer units may include about 0 to about 7.5 mole percent other monomer units (in other approaches, about 1 to about 7.5 mole percent) of one or more aminic or dispersant monomers or monomer units or other (meth)acrylic monomers or monomer units polymerized within the side chain arms to provide dispersant functionality or other dispersing functionalities to the polymer. In other approaches, the polymer may include about 2 to about 6, about 3 to about 4, or about 3 to about 5 mole percent of the dispersant or other monomer units. In one approach, an aminic or dispersant monomer or monomer unit may be nitrogen-containing monomers or units thereof such monomers, if used, may impart dispersant functionality to the polymer. In another embodiment, the alkyl (meth)acrylate monomer units of the PMA functionalities of the star polymers of the present invention further include no more than about 7.5 mole percent (in other approaches, about 0 to about 7.5 mole percent, about 2 to about 7.5 mole percent, about 2 to about 5 mole percent, about 3.3 mole percent, or about 5 mole percent) of dimethylaminopropyl (meth)acrylate (DMAPMA) monomers or dimethylaminopropyl (meth)acrylamide (DMAPMAD).

In some approaches, the nitrogen-containing monomers may be (meth)acrylic monomers such as methacrylates, methacrylamides, and the like. In some approaches, the linkage of the nitrogen-containing moiety to the acrylic moiety may be through a nitrogen atom or alternatively an oxygen atom, in which case the nitrogen of the monomer will be located elsewhere in the monomer. The nitrogen-containing monomer may also be other than a (meth)acrylic monomer, such as vinyl-substituted nitrogen heterocyclic monomers and vinyl substituted amines. Nitrogen-containing monomers are well known, examples being disclosed, for instance, in U.S. Pat. No. 6,331,603. Other suitable dispersant monomers include, but are not limited to, dialkylaminoalkyl acrylates, dialkylaminoalkyl methacrylates, dialkylaminoalkyl acrylamides, dialkylaminoalkyl methacrylamides, N-tertiary alkyl acrylamides, and N-tertiary alkyl methacrylamides, where the alkyl group or aminoalkyl groups may contain, independently, 1 to 8 carbon atoms. For instance, the dispersant monomer may be dimethylaminoethyl(meth)acrylate. The nitrogen-containing monomer may be, for instance, t-butyl acrylamide, dimethylaminopropyl methacrylamide, dimethylaminoethyl methacrylamide, N-vinyl pyrrolidone, N-vinylimidazole, or N-vinyl caprolactam. It may also be a (meth)acrylamide based on any of the aromatic amines disclosed in WO2005/087821 including 4-phenylazoaniline, 4-aminodiphenylamine, 2-aminobenzimidazole, 3-nitroaniline, 4-(4-nitrophenylazo)aniline, N-(4-amino-5-methoxy-2-methyl-phenyl)-benzamide, N-(4-amino-2,5-dimethoxy-phenyl)-benzamide, N-(4-amino-2,5-diethoxy-phenyl)-benzamide, N-(4-amino-phenyl)-benzamide, 4-amino-2-hydroxy-benzoic acid phenyl ester, and N,N-dimethyl-phenylenediamine.

The aminic or dispersant monomer may be DMAPMA (dimethylaminopropyl (meth)acrylate) or DMAPMAD (dimethylaminopropyl (meth)acrylamide), which are an aminoalkylesters having the general and specific structures shown below:

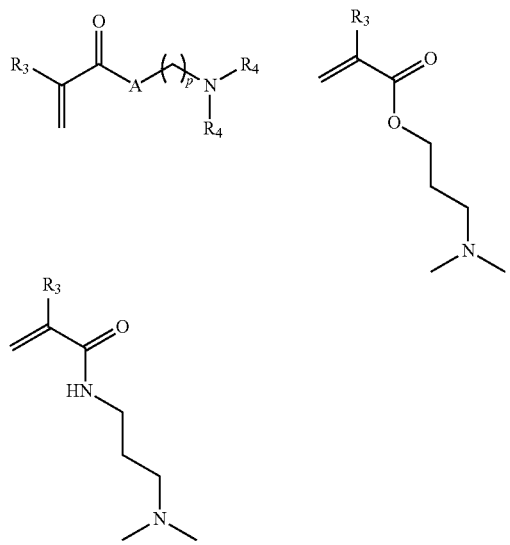

wherein $R_3$ is a hydrogen or methyl group, p is an integer from 1 to 6, each $R_4$ is independently a $C_1$ to $C_4$ alkyl or hydrocarbyl group, and A is oxygen or NH. In one approach, the short chain alkyl (meth)acrylates includes from 0 to about 30 mole percent of an aminic or dispersant monomer, such as one from the previous paragraph, the general formula above, or DMAPMA or DMAPMAD, in other approaches, about 10 to about 30 mole percent, and in yet other approaches, about 10 to about 20 mole percent.

Lubricating Oil Composition

In another aspect, the present disclosure includes a lubricant oil composition including the unique star polymer VII described above. The lubricating oil composition may be a driveline oil, an automobile transmission fluid, an engine oil, a metal working oil, and the like. In one approach, the lubricant oil composition includes a major amount (or greater than 50%) by weight of a base oil and a minor amount of at least the star polymer viscosity index improver described herein. The lubricating oil composition may also include other additives or components as discussed further below.

In one embodiment of this aspect, a treat rate (on an active or oil free basis) of the star polymer VII in the lubricant oil composition is about 1 to about 25 weight percent, in other approaches, about 1 to about 10 weight percent, and in yet other approaches, about 4 to about 10 weight percent. In some other approaches, the lubricating oil composition may include about 4.7%, about 5.2%, about 6.0%, or about 9.7 weight % of the star polymers herein as a viscosity index improver or any ranges therebetween.

As used herein, the terms "oil composition," "lubrication composition," "lubricating oil composition," "lubricating oil," "lubricant composition," "fully formulated lubricant composition," and "lubricant" are considered synonymous, fully interchangeable terminology referring to the finished lubrication product comprising a major amount of a base oil plus minor amounts of the viscosity index improver and the other optional components. In some approaches, the lubricant oil composition may be an automatic transmission fluid and, in such use, may have a Brookfield viscosity at −40° C. not more than about 30,000 cP (centipoise, units of dynamic viscosity) and, in some approaches, between about 5,000 and about 20,000 cP using ASTM-D2983. In other approaches, a kinematic viscosity at 100° C. for these lubricants oil compositions ranges from about 3.5 to about 7.0 cSt.

When used in a lubricating oil, the star polymers herein may have a so-called thickening VI of about 45 to about 65 viscosity index units per weight percent polymer in the lubricating oil composition. In some approaches, this thickening VI may be achieved with a low treat rate, on an active or polymer basis, of no more than about 10 weight percent of the star polymer in the lubricating oil. As used herein, thickening VI is a factor calculated by the viscosity index divided by the percent by weight of the polymer in the oil. The units are VI units per weight percent of the polymer in the final oil.

Base Oil:

As used herein, the term "base oil" generally refers to oils categorized by the American Petroleum Institute (API) category groups Group I-V oils as well as animal oils, vegetable oils (e.g. castor oil and lard oil), petroleum oils, mineral oils, synthetic oils, and oils derived from coal or shale. The American Petroleum Institute has categorized these different basestock types as follows: Group I, greater than 0.03 wt percent sulfur, and/or less than 90 vol percent saturates, viscosity index between 80 and 120; Group II, less than or equal to 0.03 wt percent sulfur, and greater than or equal to 90 vol percent saturates, viscosity index between 80 and 120; Group III, less than or equal to 0.03 wt percent sulfur, and greater than or equal to 90 vol percent saturates, viscosity index greater than 120; Group IV, all polyalphaolefins. Hydrotreated basestocks and catalytically dewaxed basestocks, because of their low sulfur and aromatics content, generally fall into the Group II and Group III categories. Polyalphaolefins (Group IV basestocks) are synthetic base oils prepared from various alpha olefins and are substantially free of sulfur and aromatics.

Groups I, II, and III are mineral oil process stocks. Group IV base oils contain true synthetic molecular species, which are produced by polymerization of olefinically unsaturated hydrocarbons. Many Group V base oils are also true synthetic products and may include diesters, polyol esters, polyalkylene glycols, alkylated aromatics, polyphosphate esters, polyvinyl ethers, and/or polyphenyl ethers, and the like, but may also be naturally occurring oils, such as vegetable oils. It should be noted that although Group III base oils are derived from mineral oil, the rigorous processing that these fluids undergo causes their physical properties to be very similar to some true synthetics, such as PAOs. Therefore, oils derived from Group III base oils may sometimes be referred to as synthetic fluids in the industry.

The base oil used in the disclosed lubricating oil composition may be a mineral oil, animal oil, vegetable oil, synthetic oil, or mixtures thereof. Suitable oils may be derived from hydrocracking, hydrogenation, hydrofinishing, unrefined, refined, and re-refined oils, or mixtures thereof.

Unrefined oils are those derived from a natural, mineral, or synthetic source with or without little further purification treatment. Refined oils are similar to unrefined oils except that they have been treated by one or more purification steps, which may result in the improvement of one or more properties. Examples of suitable purification techniques are solvent extraction, secondary distillation, acid or base extraction, filtration, percolation, and the like. Oils refined to the quality of an edible oil may or may not be useful. Edible oils may also be called white oils. In some embodiments, lubricant compositions are free of edible or white oils.

Re-refined oils are also known as reclaimed or reprocessed oils. These oils are obtained in a manner similar to that used to obtain refined oils using the same or similar processes. Often these oils are additionally processed by techniques directed to removal of spent additives and oil breakdown products.

Mineral oils may include oils obtained by drilling, or from plants and animals and mixtures thereof. For example such oils may include, but are not limited to, castor oil, lard oil, olive oil, peanut oil, corn oil, soybean oil, and linseed oil, as well as mineral lubricating oils, such as liquid petroleum oils and solvent-treated or acid-treated mineral lubricating oils of the paraffinic, naphthenic or mixed paraffinic-naphthenic types. Such oils may be partially or fully-hydrogenated, if desired. Oils derived from coal or shale may also be useful.

Useful synthetic lubricating oils may include hydrocarbon oils such as polymerized, oligomerized, or interpolymerized olefins (e.g., polybutylenes, polypropylenes, propyleneisobutylene copolymers); poly(1-hexenes), poly(1-octenes), trimers or oligomers of 1-decene, e.g., poly(1-decenes), such materials being often referred to as α-olefins, and mixtures thereof; alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); diphenyl alkanes, alkylated diphenyl alkanes, alkylated diphenyl ethers and alkylated diphenyl sulfides and the derivatives, analogs and homologs thereof or mixtures thereof.

Other synthetic lubricating oils include polyol esters, diesters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerized Fischer-Tropsch hydrocarbons or waxes. In an embodiment, oils may be prepared by a Fischer-Tropsch gas-to-liquid synthetic procedure as well as from other gas-to-liquid oils.

The amount of the base or lubricating oil present may be the balance remaining after subtracting from 100 wt % the sum of the amounts of the viscosity index improver noted herein as well as any further optional performance additives also noted herein. For example, the base or lubricating oil that may be present in a finished fluid may be a major amount, such as greater than about 50 wt. %, greater than about 60 wt. %, greater than about 70 wt. %, greater than about 80 wt. %, greater than about 85 wt. %, or greater than about 90 wt. %.

The lubricants may also include other optional additives as needed for particular applications. Several common optional additives are noted herein.

Optional Additive Components

In addition to the base oils and viscosity index improvers set forth above, lubricant compositions such as on the automatic transmission lubricating compositions, may also include other additives to perform one or more functions required of a lubricating fluid. Further, one or more of the mentioned additives may be multi-functional and provide other functions in addition to or other than the function prescribed herein.

For example, the compositions herein may include one or more of at least one component selected from the group consisting of an additional viscosity index improver, a dispersant, a detergent, a friction modifier, an antioxidant, a corrosion inhibitor, a foam inhibitor, a seal-swell agent, anti-rust agent, extreme pressure additives, anti-wear agents, and combinations thereof. Other performance additives may also include, in addition to those specified above, one or more of metal deactivators, ashless TBN boosters, demulsifiers, emulsifiers, pour point depressants, and mixtures thereof. Typically, fully-Formulated lubricating oils will contain one or more of these performance additives. Examples of some common optional additive components are set forth below.

Additional Viscosity Modifiers:

The lubricating oil compositions herein also may optionally contain one or more additional or supplemental viscosity index improvers. Suitable supplemental viscosity index improvers may include polyolefins, olefin copolymers, ethylene/propylene copolymers, polyisobutenes, hydrogenated styrene-isoprene polymers, styrene/maleic ester copolymers, hydrogenated styrene/butadiene copolymers, hydrogenated isoprene polymers, alpha-olefin maleic anhydride copolymers, poly(meth)acrylates, polyacrylates, polyalkyl styrenes, hydrogenated alkenyl aryl conjugated diene copolymers, or mixtures thereof. Viscosity index improvers may include star polymers, comb polymers, and suitable examples may be described in US Publication No. 2012/0101017 A1.

The lubricating oil compositions herein also may optionally contain one or more dispersant viscosity index improvers in addition to the star polymer viscosity index improvers discussed above. Suitable dispersant viscosity index improvers may include functionalized polyolefins, for example, ethylene-propylene copolymers that have been functionalized with the reaction product of an acylating agent (such as maleic anhydride) and an amine; poly(meth)acrylates functionalized with an amine, or esterified maleic anhydride-styrene copolymers reacted with an amine.

If used, any additional viscosity modifier may be provided in about 0.01 to about 10 weight percent in the lubricant.

Dispersants:

The lubricant composition includes one or more select dispersants or mixtures thereof. Dispersants are often known as ashless-type dispersants because, prior to mixing in a lubricating oil composition, they do not contain ash-forming metals and they do not normally contribute any ash when added to a lubricant. Ashless-type dispersants are characterized by a polar group attached to a relatively high molecular weight hydrocarbon chain. Specific ashless dispersants discovered for the present disclosure include boronated and phosphorylated N-substituted long chain alkenyl succinimides.

The N-substituted long chain alkenyl succinimides may include polyisobutylene (PIB) substituents with a number average molecular weight of the polyisobutylene substituent in a range of about 1300 to about 2300 as determined by gel permeation chromatography (GPC) using polystyrene (with a number average molecular weight of 180 to about 18,000) as the calibration reference. The PIB substituent used in the dispersant also has a viscosity at 100° C. of about 2100 to about 2700 cSt as determined using ASTM D445. Succinimide dispersants and their preparation are disclosed, for instance in U.S. Pat. No. 7,897,696 and U.S. Pat. No. 4,234,435, which are incorporated herein by reference. Succinimide dispersants are typically an imide formed from a polyamine, typically a poly(ethyleneamine). The dispersants typically include two succinimide moieties joined by a polyamine. The polyamine may be tetraethylenepentaamine (TEPA), triethylenetetraamine (TETA), pentaethylenhexaamine (PEHA), other higher nitrogen ethylene diamine species and/or mixtures thereof. The polyamines may be mixtures of linear, branched and cyclic amines. The PIB substituents may be joined to each succinimide moiety.

The N-substituted polyisobutylene succinimides dispersants herein may also boronated and phosphorylated in order to achieve the desired friction properties. These dispersants are generally the reaction products of i) at least one phosphorus compound and/or a boron compound and ii) at least one ashless dispersant.

Suitable boron compounds useful in forming the dispersants herein include any boron compound or mixtures of boron compounds capable of introducing boron-containing species into the ashless dispersant. Any boron compound, organic or inorganic, capable of undergoing such reaction can be used. Accordingly, use can be made of boron oxide, boron oxide hydrate, boron trifluoride, boron tribromide, boron trichloride, $HBF_4$ boron acids such as boronic acid (e.g. alkyl-$B(OH)_2$, or aryl-$B(OH)_2$), boric acid, (i.e., $H_3BO_3$), tetraboric acid (i.e., $H_2B_5O_7$), metaboric acid (i.e., $HBO_2$), ammonium salts of such boron acids, and esters of such boron acids. The use of complexes of a boron trihalide with ethers, organic acids, inorganic acids, or hydrocarbons is a convenient means of introducing the boron reactant into the reaction mixture. Such complexes are known and are exemplified by boron trifluoride-diethyl ether, boron trifluoride-phenol, boron trifluoride-phosphoric acid, boron trichloride-chloroacetic acid, boron tribromide-dioxane, and boron trifluoride-methyl ethyl ether.

Suitable phosphorus compounds for forming the dispersants herein include phosphorus compounds or mixtures of phosphorus compounds capable of introducing a phosphorus-containing species into the ashless dispersant. Any phosphorus compound, organic or inorganic, capable of undergoing such reaction can thus be used. Accordingly, use can be made of such inorganic phosphorus compounds as the inorganic phosphorus acids, and the inorganic phosphorus oxides, including their hydrates. Typical organic phosphorus compounds include full and partial esters of phosphorus acids, such as the mono-, di-, and tri esters of phosphoric acid, thiophosphoric acid, dithiophosphoric acid, thiophosphoric acid and tetrathiophosphoric acid; the mono-, di-, and tri esters of phosphorous acid, thiophosphorous acid, dithiophosphorous acid and trithiophosphorous acid; the trihydrocarbyl phosphine oxides: the trihydrocarbyl phosphine sulfides; the mono- and dihydrocarbyl phosphonates, (RPO(OR')(OR")) where R and R' are hydrocarbyl and R" is a hydrogen atom or a hydrocarbyl group), and their mono-, di- and trithio analogs; the mono- and dihydrocarbyl phosphonites, (RP(OR)(OR")) where R and R' are hydrocarbyl and R" is a hydrogen atom or a hydrocarbyl group) and their mono- and dithio analogs; and the like. Thus, use can be made of such compounds as, for example, phosphorous acid ($H_3PO_3$, sometimes depicted as $H_2(HPO_3)$, and sometimes called ortho-phosphorous acid or phosphonic acid), phosphoric acid ($H_3PO_4$, sometimes called orthophosphoric acid), hypophosphoric acid ($H_4P_2O_6$), metaphosphoric acid ($HPO_3$), pyrophosphoric acid ($H_4P_2O_7$), hypophosphorous acid ($H_3PO_2$, sometimes called phosphinic acid), pyrophosphorous acid ($H_4P_2O_5$, sometimes called pyrophosphonic acid), phosphinous acid ($H_3PO$), tripolyphosphoric acid ($H_5P_3O_{10}$), tetrapolyphosphoric acid ($H_5P_4O_{13}$), trimetaphosphoric acid ($H_3P_3O_9$), phosphorus trioxide, phosphorus tetraoxide, phosphorus pentoxide, and the like. Partial or total sulfur analogs such as phosphorotetrathioic acid ($H_3PS_4$), phosphoromonothioic acid ($H_3PO_3S$), phosphorodithioic acid ($H_3PO_2S_2$), phosphorotrithioic acid ($H_3POS_3$), phosphorus sesquisulfide, phosphorus heptasulfide, and phosphorus pentasulfide ($P_2S_5$, sometimes referred to as $P_4S_{10}$) can also be used in forming dispersants for this disclosure. Also usable, though less preferred, are the inorganic phosphorus halide compounds such as $PCl_3$, $PBr_3$, $POCl_3$, $PSCl_3$, etc.

Likewise use can be made of such organic phosphorus compounds as mono-, di-, and triesters of phosphoric acid (e.g., trihydrocarbyl phosphates, dihydrocarbyl monoacid phosphates, monohydrocarbyl diacid phosphates, and mixtures thereof), mono-, di, and triesters of phosphorous acid (e.g., trihydrocarbyl phosphites, dihydrocarbyl hydrogen phosphites, hydrocarbyl diacid phosphites, and mixtures thereof), esters of phosphonic acids (both "primary", RP(O)(OR)$_2$, and "secondary", $R_2P(O)(OR)$), esters of phosphinic acids, phosphonyl halides (e.g., $RP(O)Cl_2$ and $R_2P(O)Cl$), halophosphites (e.g., $(RO)PCl_2$ and $(RO)_2PCl$), halophosphates (e.g., $ROP(O)Cl_2$ and $(RO)_2P(O)Cl$), tertiary pyrophosphate esters (e.g., $(RO)_2P(O)$—O—$P(O)(OR)_2$), and the total or partial sulfur analogs of any of the foregoing organic phosphorus compounds, and the like wherein each hydrocarbyl group contains up to about 100 carbon atoms, preferably up to about 50 carbon atoms, more preferably up to about 24 carbon atoms, and most preferably up to about 12 carbon atoms. Also usable, although less preferred, are the halophosphine halides (e.g., hydrocarbyl phosphorus tetrahalides, dihydrocarbyl phosphorus trihalides, and trihydrocarbyl phosphorus dihalides), and the halophosphines (monohalophosphines and dihalophosphines).

The lubricants herein may include mixtures of one or more boronated and phosphorylated dispersants set forth above combined with non-boronated and non-phosphorylated dispersants as long as the called for dispersant requirements set forth above are still met in the lubricant.

If used, treat rates of the dispersants described above are provided in about 1 to about 15 weight percent and, in other approaches, about 2 to about 13 weight percent, and in yet other approaches, about 4 to about 10 weight percent in the lubricant.

Detergent:

The lubricant composition also includes one or more detergents or mixtures. By one approach, the detergent is a metal containing detergent, such as neutral to overbased detergents. Suitable detergent substrates include phenates, sulfur containing phenates, sulfonates, calixarates, salixarates, salicylates, carboxylic acids, phosphorus acids, mono- and/or di-thiophosphoric acids, alkyl phenols, sulfur coupled alkyl phenol compounds and methylene bridged phenols. Suitable detergents and their methods of preparation are described in greater detail in numerous patent publications, including U.S. Pat. No. 7,732,390, and references cited therein. In one approach, the detergents are neutral to overbased sulfonates, phenates, or carboxylates with an alkali metal or alkaline earth metal salt. The detergents may be linear or branched, such as linear or branched sulfonates. Linear detergents are those that include a straight chain with no side chains attached thereto and typically include carbon atoms bonded only to one or two other carbon atoms. Branched detergents are those with one or more side chains attached to the molecule's backbone and may include carbon atoms bonded to one, two, three, or four other carbon atoms. In one embodiment the sulfonate detergent may be a predominantly linear alkylbenzenesulfonate detergent. In some embodiments the linear alkyl (or hydrocarbyl) group may be attached to the benzene ring anywhere along the linear chain of the alkyl group, but often in the 2, 3, or 4 position of the linear chain, and in some instances predominantly in the 2 position. In other embodiments, the alkyl (or hydrocarbyl) group may be branched, that is, formed from a branched olefin such as propylene or 1-butene or isobutene. Sulfonate detergents having a mixture of linear and branched alkyl groups may also be used.

The detergent substrate may be salted with an alkali or alkaline earth metal such as, but not limited to, calcium, magnesium, potassium, sodium, lithium, barium, or mixtures thereof. In some embodiments, the detergent is free of barium. A suitable detergent may include alkali or alkaline earth metal salts of petroleum sulfonic acids and long chain mono- or di-alkylarylsulfonic acids with the aryl group being one of benzyl, tolyl, and xylyl.

Overbased detergent additives are well known in the art and may be alkali or alkaline earth metal overbased detergent additives. Such detergent additives may be prepared by reacting a metal oxide or metal hydroxide with a substrate and carbon dioxide gas. The substrate is typically an acid, for example, an acid such as an aliphatic substituted sulfonic acid, an aliphatic substituted carboxylic acid, or an aliphatic substituted phenol. In general, the terminology "overbased" relates to metal salts, such as metal salts of sulfonates, carboxylates, and phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the metal ratio is one and in an overbased salt, the MR, is greater than one. Such salts are commonly referred to as overbased, hyperbased, or superbased salts and may be salts of organic sulfur acids, carboxylic acids, or phenols. The detergents may also exhibit a total base number (TBN) of about 27 to about 450 and, in other approaches, about 200 to about 400.

If used, the treat rates of the detergent may be about 0.05 weight percent to about 7 weight percent based on the total weight of the lubricant composition.

Friction Modifiers:

The lubricating oil compositions herein may also optionally contain one or more friction modifiers. Suitable friction modifiers may comprise metal containing and metal-free friction modifiers and may include, but are not limited to, imidazolines, amides, amines, succinimides, alkoxylated amines, alkoxylated ether amines, amine oxides, amidoamines, nitriles, betaines, quaternary amines, imines, amine salts, amino guanidines, alkanolamides, phosphonates, metal-containing compounds, glycerol esters, sulfurized fatty compounds and olefins, sunflower oil and other naturally occurring plant or animal oils, dicarboxylic acid esters, esters or partial esters of a polyol and one or more aliphatic or aromatic carboxylic acids, and the like.

Suitable friction modifiers may contain hydrocarbyl groups that are selected from straight chain, branched chain, or aromatic hydrocarbyl groups or mixtures thereof, and may be saturated or unsaturated. The hydrocarbyl groups may be composed of carbon and hydrogen or hetero atoms such as sulfur or oxygen. The hydrocarbyl groups may range from about 12 to about 25 carbon atoms. In an embodiments the friction modifier may be a long chain fatty acid ester. In an embodiment the long chain fatty acid ester may be a mono-ester, or a di-ester, or a (tri)glyceride. The friction modifier may be a long chain fatty amide, a long chain fatty ester, a long chain fatty epoxide derivative, or a long chain imidazoline.

Other suitable friction modifiers may include organic, ashless (metal-free), nitrogen-free organic friction modifiers. Such friction modifiers may include esters formed by reacting carboxylic acids and anhydrides with alkanols and generally include a polar terminal group (e.g. carboxyl or hydroxyl) covalently bonded to an oleophilic hydrocarbon chain. An example of an organic ashless nitrogen-free friction modifier is known generally as glycerol monooleate (GMO) which may contain mono-, di-, and tri-esters of oleic acid. Other suitable friction modifiers are described in U.S. Pat. No. 6,723,685.

Aminic friction modifiers may include amines or polyamines. Such compounds can have hydrocarbyl groups that are linear, either saturated or unsaturated, or a mixture thereof and may contain from about 12 to about 25 carbon atoms. Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Examples include ethoxylated amines and ethoxylated ether amines.

The amines and amides may be used as such or in the form of an adduct or reaction product with a boron compound such as a boric oxide, boron halide, metaborate, boric acid or a mono-, di- or tri-alkyl borate. Other suitable friction modifiers are described in U.S. Pat. No. 6,300,291.

Antioxidants:

The lubricating oil compositions herein also may optionally contain one or more antioxidants. Antioxidant compounds are known and include, for example, phenates, phenate sulfides, sulfurized olefins, phosphosulfurized terpenes, sulfurized esters, aromatic amines, alkylated diphenylamines (e.g., nonyl diphenylamine, di-nonyl diphenylamine, octyl diphenylamine, di-octyl diphenylamine), phenyl-alpha-naphthylamines, alkylated phenyl-alpha-naphthylamines, hindered non-aromatic amines, phenols, hindered phenols, oil-soluble molybdenum compounds, macromolecular antioxidants, or mixtures thereof. Antioxidants may be used alone or in combination.

Corrosion Inhibitors:

The automatic transmission lubricants may further include additional corrosion inhibitors (it should be noted that some of the other mentioned components may also have copper corrosion inhibition properties). Suitable additional inhibitors of copper corrosion include ether amines, poly-ethoxylated compounds such as ethoxylated amines and ethoxylated alcohols, imnidazolines, monoalkyl and dialkyl thiadiazole, and the like.

Thiazoles, triazoles and thiadiazoles may also be used in the lubricants. Examples include benzotriazole; tolyltriazole; octyltriazole; decyltriazole; dodecyltriazole; 2-mercaptobenzotriiazole; 2,5-dimercapto-1,3,4-thiadiazole; 2-mercapto-5-hydrocarbylthio-1,3,4-thiadiazoles; and 2-mercapto-5-hydrocarbylthio-1,3,4-thiadiazoles. The preferred compounds are the 1,3,4-thiadiazoles, especially the 2-hydrocarbyldithio-5-mercapto-1,3,4-dithiadiazoles, a number of which are available as articles of commerce.

Foam Inhibitors/Anti Foam Agents:

Anti-foam/Surfactant agents may also be included in a fluid according to the present disclosure. Various agents are known for such use. Especially preferred are copolymers of ethyl acrylate and hexyl ethyl acrylate, such as PC-1244, available from Solutia. Preferred are silicone fluids, such as 4% DCF. Mixtures of anti-foam agents are especially preferred.

Seal-Swell Agents:

The automatic transmission fluids of the present disclosure may further include seal swell agents. Seal swell agents such as esters, adipates, sebacates, azealates, phthalates, sulfones, alcohols, alkyibenzenes, substituted sulfolanes, aromatics, or mineral oils cause swelling of elastomeric materials used as seals in engines and automatic transmissions.

Alcohol-type seal swell agents are generally low volatility linear alkyl alcohols, such as decyl alcohol, tridecyl alcohol and tetradecyl alcohol. Alkylbenzenes useful as seal swell agents include dodecylbenzenes, tetradecylbenzenes, dinonyl-benzenes, di(2-ethylhexyl)benzene, and the like. Substituted sulfolanes (e.g. those described in U.S. Pat. No. 4,029,588, incorporated herein by reference) are likewise useful as seal swell agents in compositions according to the present invention. Mineral oils useful as seal swell agents in the present disclosure include low viscosity mineral oils with high naphthenic or aromatic content. Aromatic seal swell agents include the commercially available Exxon Aromatic 200 ND seal swell agent. Commercially available examples of mineral oil seal swell agents include Exxon® Necton®-37 (FN 1380) and Exxon® Mineral Seal Oil (FN 3200).

Anti-Rust Agents:

Various known anti-rust agents or additives are known for use in transmission fluids, and are suitable for use in the fluids according to the present disclosure. Especially preferred are alkyl polyoxyalkylene ethers, such as Mazawet® 77, C-8 acids such as Neofat® 8, oxyalkyl amines such as Tomah PA-14, 3-decyloxypropylamine, and polyoxypropylene-polyoxyethylene block copolymers suc1 as Pluronic® L-81.

Extreme Pressure Agents:

The lubricating oil compositions herein also may optionally contain one or more extreme pressure agents. Extreme Pressure (EP) agents that are soluble in the oil include sulfur- and chlorosulfur-containing EP agents, chlorinated hydrocarbon EP agents and phosphorus EP agents. Examples of such EP agents include chlorinated waxes; organic sulfides and polysulfides such as dibenzyldisulfide, bis(chlorobenzyl) disulfide, dibutyl tetrasulfide, sulfurized methyl ester of oleic acid, sulfurized alkylphenol, sulfurized dipentene, sulfurized terpene, and sulfurized Diels-Alder adducts; phosphosulfurized hydrocarbons such as the reaction product of phosphorus sulfide with turpentine or methyl oleate; phosphorus esters such as the dihydrocarbyl and trihydrocarbyl phosphites, e.g., dibutyl phosphite, diheptyl phosphite, dicyclohexyl phosphite, pentylphenyl phosphite; dipentylphenyl phosphite, tridecyl phosphite, distearyl phosphite and polypropylene substituted phenyl phosphite; metal thiocarbamates such as zinc dioctyldithiocarbamate and barium heptylphenol diacid; amine salts of alkyl and dialkylphosphoric acids, including, for example, the amine salt of the reaction product of a dialkyldithiophosphoric acid with propylene oxide; and mixtures thereof.

Anti-Wear Agents:

The lubricating oil compositions herein also may optionally contain one or more anti-wear agents. Examples of suitable antiwear agents include, but are not limited to, a metal thiophosphate; a metal dialkyldithiophosphate; a phosphoric acid ester or salt thereof; a phosphate ester(s); a phosphite; a phosphorus-containing carboxylic ester, ether, or amide; a sulfurized olefin; thiocarbamate-containing compounds including, thiocarbamate esters, alkylene-coupled thiocarbamates, and bis(S-alkyldithiocarbamyl) disulfides; and mixtures thereof. A suitable antiwear agent may be a molybdenum dithiocarbamate. The phosphorus containing antiwear agents are more fully described in European Patent 612 839. The metal in the dialkyl dithio phosphate salts may be an alkali metal, alkaline earth metal, aluminum, lead, tin, molybdenum, manganese, nickel, copper, titanium, or zinc. A useful antiwear agent may be zinc dialkyldithiophosphate.

Further examples of suitable antiwear agents include titanium compounds, tartrates, tartrimides, oil soluble amine salts of phosphorus compounds, sulfurized olefins, phosphites (such as dibutyl phosphite), phosphonates, thiocarbamate-containing compounds, such as thiocarbamate esters, thiocarbamate amides, thiocarbamic ethers, alkylene-coupled thiocarbamates, and bis(S-alkyldithiocarbamyl) disulfides. The tartrate or tartrimide may contain alkyl-ester groups, where the sum of carbon atoms on the alkyl groups may be at least 8. The antiwear agent may in one embodiment include a citrate.

The antiwear agent may be present in ranges including about 0 wt % to about 15 wt %, in other approaches, about 0.01 wt % to about 10 wt %, in yet other approaches, about 0.05 wt % to about 5 wt %, or, in further approaches, about 0.1 wt % to about 3 wt % of the lubricating oil composition.

As used herein the term "viscosity index" is an arbitrary measure for the change of viscosity with variations in temperature. The viscosity index can be calculated using the $$VI=100*[(L-U)/(L-H)], \text{ where}$$ Formula:

L=kinematic viscosity at 40° C. of an oil of 0 viscosity index having the same kinematic viscosity at 100° C. as the oil whose viscosity index is to be calculated, mm$^2$/s (cSt);

H=kinematic viscosity at 40° C. of an oil of 100 viscosity index having the same kinematic viscosity at 100° C. as the oil whose viscosity index is to be calculated mm$^2$/s (cSt); and U=kinematic viscosity at 40° C. of the oil whose viscosity index is to be calculated mm$^2$/s (cSt).

As measured herein, the conditions for measuring KV100 is using an approximately 2.3 cSt group 3 base oil (UltraS2) with about 7.7 weight percent DI package and a targeted KV100 of about 6 cSt after addition of the star VII polymer. The polymers described in this disclosure and including one or more features as described throughout and in the Summary may exhibit a VI of about 200 or greater, in some approaches, about 200 to about 350, and in other approaches, about 250 to about 300.

As used herein, the term "treat rate" refers to the weight percent of a component in the lubricant oil. For example, the treat rate of a specific polymer in an oil composition is the weight percent of the polymer in the composition: treat rate=(weight of the polymer in an oil free basis)/(weight of the entire composition)×100%. As mentioned above, treat rate of the polymers herein refers to the solids of the polymer absent any oil or carrier fluid used during its polymerization.

As used herein, the term "polydispersity index" is synonymous with the term "dispersity" and is equal to the (weight average molecular weight)/(number average molecular weight)

Based on the above discussion, exemplary ranges of various lubricating composition components are set forth in Table 1 below.

TABLE 1

Lubricant Composition

| Component | Example Ranges, Weight Percent | Additional Example Ranges, Weight Percent |
|---|---|---|
| Star polymer VII | 1 to 20 | 1 to 10 |
| Dispersants | 4.5 to 25 | 4.5 to 12 |
| Detergents | 0.1 to 15 | 0.8 to 10 |
| Friction Modifiers | 0 to 6 | 0.005 to 4 |
| Antioxidants | 0 to 2 | 0.05 to 1 |
| Rust Inhibitors | 0 to 1 | 0.005 to 0.5 |
| Corrosion Inhibitors | 0 to 1.2 | 0.005 to 0.8 |
| Anti-wear Agents | 0 to 5 | 0 to 3 |
| Seal Swell Agents | 0 to 20 | 0 to 10 |
| Antifoam Agents | 0 to 1 | 0.005 to 0.8 |
| Extreme Pressure Agents | 0 to 2 | 0 to 1 |
| Base Oils | Balance | Balance |

The viscosity index improvers described herein are particularly suited for lubricants designed for automobiles, such as driveline fluids, engine oils, and/or automatic transmission fluid. In some approaches, suitable automatic transmissions may include a wet friction clutch transmission and typically have a plurality of clutch plates (may be at least three and may be up to six), such as those with a cellulose based friction lining and each having an associated steel reaction plate packed together in a housing between an application piston and a release spring. Such transmission may also include other common components such as a waved or cushion plates, spacer plates, and/or retention rings. The wet friction clutch is operated in a conventional manner by the selected application of fluid pressure using the lubricating transmission fluid and viscosity index improvers described herein.

Materials and Methods

Lauryl (meth)acrylate (LMA), methyl (meth)acrylate (MMA), and cetyl-eicosyl (meth)acrylate (CEMA) in the Examples below are from Evonik Oil Additives USA. 2-hydroxyethyl (meth)acrylate (HEMA) in the Examples is from Sigma Aldrich. In the examples below, Vazo™ 67 (2.2'-Azobis(2-methylbutyronitrile)) from Chemours was used as polymerization initiator. Base oil used for polymerization reaction was 80N ConocoPhillips group 2 base oil (KV100 is about 3.0 cSt). The base oil used for blend study was 2ULTRAS (PHILLIPS66 group 3 base oil). A general synthetic strategy includes the following:

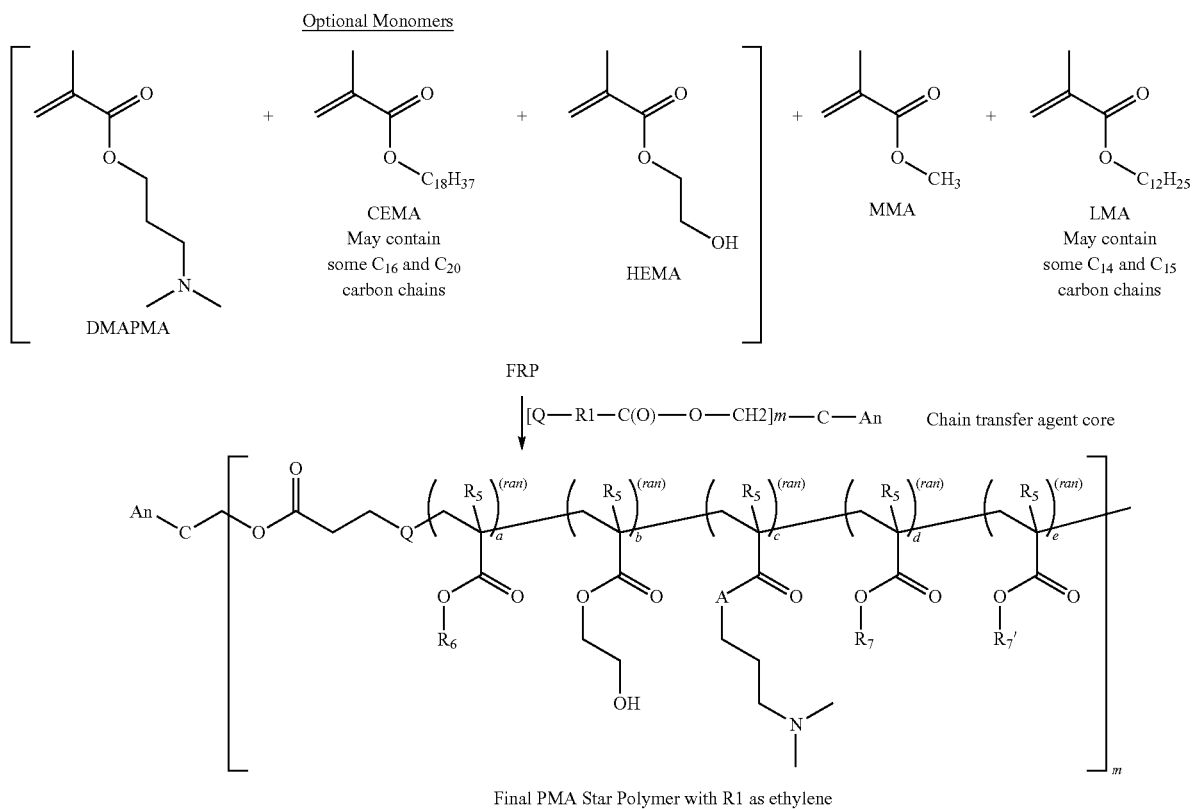

Final PMA Star Polymer with R1 as ethylene

The above shows a general procedure for PMA star polymer synthesis of the Examples herein via the conventional free radical polymerization (FRP) pathway using multi-functional thiol core as a chain transfer agent core, as well as the resulting polymer backbone. In this Example, methacrylate monomers were used, but as described herein, the monomers may be either acrylate or methacrylate.

In the general scheme above, the monomers are reacted together in a solvent (e.g. 80N Conoco Phillips group 2 base oil) at an elevated temperature (e.g. 80-85° C.) with an initiator as noted above and using a multi-thiol functional core, such as penta-erythritol tetrakis (3-mercapto propionate) as shown in Scheme 1. The resulting PMA star polymer product is provided in the scheme above, wherein a, b, c, d, and e are integers sufficient to provide the mole percent of each monomer as discussed above in the PMA arms. The associated moieties or groups of integers a, b, c, d, and e randomly polymerized as the side chains or star arms of the polymer. While the structure above shows the "a" group bonded to the Q moiety, any of the a, b, c, d, or e groups may be randomly Q moiety or sulfur thereof. In the formula, m and n are integers that represent the extent of sulfur functionalization of the core of the final star polymer product. The relative abundance of each monomer unit in the PMA arms is based on the relative concentrations of the monomers in the original reaction mixture. In the present disclosure, b, c, and e can be zero.

A better understanding of the present disclosure and its many advantages may be clarified with the following examples. The following examples are illustrative and not limiting thereof in either scope or spirit. Those skilled in the art will readily understand that variations of the components, methods, steps, and devices described in these examples can be used. Unless noted otherwise, all percentages, ratios, and parts noted in this disclosure are by weight.

EXAMPLES

Example 1

This Example illustrates the formation of core-first star PMAs, which have linear random copolymers as arms. The polymers were synthesized with desired molar ratios as set forth in Table 2 below by conventional free radical polymerization (FRP).

The PMAs by FRP were synthesized by following the procedure described as below: C12-15 methacrylate (LMA), methyl methacrylate (MMA), 2-hydroxyethyl methacrylate (HEMA), and cetyl-eiocosyl methacrylate (CEMA) were charged in a glass reactor in a required amount. Additionally desired amount of multifunctional chain transfer agent core (such as pentaerythritol tetrakis (3-mercaptopropionate)) and Group II base oil were charged in a reactor equipped with a nitrogen inlet flowing at 0.3 SCFH, medium speed mechanical stirrer, a thermocouple and a water-cooled condenser and the reaction medium was stirred under $N_2$ bubble for 30 minutes to ensure mixing. The mixture was heated to 83° C., added 2,2'-Azobis(2-methylbutyronitrile), and reacted for 4 hours at the temperature, followed by the collection of sample for analysis. Additional oil was added after the reaction for an easy handling of the polymer and mixed at desired temperature until it became homogeneous. Molecular weight was measured by gel permeation chromatography (GPC) equipped with RI detector. The results obtained for weight average molecular weight (Mw), number average molecular weight (Mn), and the polydispersity are shown in a table in the excel sheet. Synthesized PMAs were blended in hydrocarbon base oil with relevant DI package and analyzed for PMAs' performance. Results are shown in Tables 2 and 3 below.

TABLE 2

(mol percent of PMA star arms)

| ID | Multi-functional chain Transfer Agent Core | LMA, mol % | MMA, mol % | HEMA, mol % | CEMA, mol % | Composition | KV100 (cSt) | MW+ (Kg/mol) | PDI++ |
|---|---|---|---|---|---|---|---|---|---|
| 1 | Pentaerythritol tetrakis (3-mercaptopropionate) | 70 | 20 | 10 |  | 4 arm Random | 366.1 | 165.7 | 2.19 |
| 2 | Pentaerythritol tetrakis (3-mercaptopropionate) | 70 | 20 | 10 |  | 4 arm Random | 574.7 | 215.2 | 2.71 |
| 3 | Pentaerythritol tetrakis (3-mercaptopropionate) | 70 | 20 | 5 | 5 | 4 arm Random | 167.1 | 114.8 | 1.99 |
| 4 | Pentaerythritol tetrakis (3-mercaptopropionate) | 70 | 20 | 5 | 5 | 4 arm Random | 58.55 | 45.2 | 1.64 |

+MW is the weight average molecular weight
++PDI is the polydispersity index (weight average molecular weight/number average molecular weight)

TABLE 3

| ID | % Treat rate | % Polymer | KV100 (cSt) | KV40 (cSt) | VI | BF-40C (cP) | 20 H KRL (%) | Thickening VI |
|---|---|---|---|---|---|---|---|---|
| 1 | 13.0 | 5.2 | 6.041 | 19.98 | 285.0 | 1990 | 27.3 | 54.8 |
| 2 | 11.65 | 4.7 | 5.996 | 19.46 | 292.5 | 2200 | 28.4 | 62.2 |
| 3 | 15 | 6.0 | 6.082 | 20.89 | 270.2 | 4169 | 25.2 | 45.0 |
| 4 | 24.25 | 9.70 | 5.981 | 22.39 | 236.6 | 250000 | 11.6 | 24.3 |

KV100 and KV40 are kinematic viscosity measured at either 100° C. or 40° C., respectively VI is the viscosity index as defined herein;
BF-40 is Brookfield viscosity measured at −40° C; and
KRL is Kluber Lubrication Shear Stability measured by method CEC L-45 and is the percent KV viscosity loss of the KV original viscosity at 100° C. after perform the 20 hour test.
Thickening VI is a factor of (VI)/(% polymer) and is VI units per weight percent of polymer in the oil.
% Polymer is the weight % of the active polymer in the oil (no diluent).

It is to be understood that while the polymer and lubricant of this disclosure have been described in conjunction with the detailed description thereof and summary herein, the foregoing description is intended to illustrate and not limit the scope of the disclosure, which is defined by the scope of the appended claims. Other aspects, advantages, and modifications are within the scope of the claims. It is intended that the specification and examples be considered as exemplary only, with a true scope of the disclosure being indicated by the following claims.

Other embodiments of the present disclosure will be apparent to those skilled in the art from consideration of the specification and practice of the embodiments disclosed herein. As used throughout the specification and claims, "a" and/or "an" may refer to one or more than one. Unless otherwise indicated, all numbers expressing quantities of ingredients, properties such as molecular weight, percent, ratio, reaction conditions, and so forth used in the specification are to be understood as being modified in all instances by the term "about," whether or not the term "about" is present. Accordingly, unless indicated to the contrary, the numerical parameters set forth in the specification are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

The patentees do not intend to dedicate any disclosed embodiments to the public, and to the extent any disclosed modifications or alterations may not literally fall within the scope of the claims, they are considered to be part hereof under the doctrine of equivalents.

It is to be understood that each component, compound, substituent or parameter disclosed herein is to be interpreted as being disclosed for use alone or in combination with one or more of each and every other component, compound, substituent or parameter disclosed herein.

It is also to be understood that each amount/value or range of amounts/values for each component, compound, substituent or parameter disclosed herein is to be interpreted as also being disclosed in combination with each amount/value or range of amounts/values disclosed for any other component(s), compounds(s), substituent(s) or parameter(s) disclosed herein and that any combination of amounts/values or ranges of amounts/values for two or more component(s), compounds(s), substituent(s) or parameters disclosed herein are thus also disclosed in combination with each other for the purposes of this description.

It is further understood that each range disclosed herein is to be interpreted as a disclosure of each specific value within the disclosed range that has the same number of significant digits. Thus, a range of from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

What is claimed is:

1. A poly(meth)acrylate star polymer comprising a polymer of Formula I

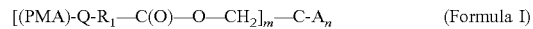

[(PMA)-Q-R$_1$—C(O)—O—CH$_2$]$_m$—C-A$_n$ (Formula I)

wherein
PMA is a polymeric chain with randomly polymerized (meth)acrylate monomer units including from about 20 to about 35 mole percent short chain alkyl (meth)acrylate monomer units with alkyl chain lengths of 1 to 4 carbons, about 60 to about 80 mole percent long chain alkyl (meth)acrylate monomer units with alkyl chain lengths of 12 to 20 carbons, and optionally about 5 to about 10 mole percent oxygen-functional alkyl (meth)acrylate monomer units with hydroxy alkyl chains including 2 to 7 carbons;
each Q is independently a sulfur atom;
R$_1$ is an alkylene group of 1 to 10 carbons;
A is hydrogen, an alkyl group, or a group independently selected from Formula A1, A2, or A3:

—O—C(O)—R$_1$-Q-(PMA)  (Formula A1);

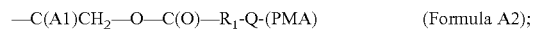

—C(A1)CH$_2$—O—C(O)—R$_1$-Q-(PMA)  (Formula A2);

—CH$_2$—O—CH2—C—[CH$_2$—O—C(O)-Q-(PMA)]$_r$ (Formula A3);

m is an integer from 1 to 4 and if m is less than 4, then A includes at least one group independently selected from the hydrogen, the alkyl group or the Formulas A1, A2, or A3;
n is 0 or an integer from 1 to 4;
r is an integer from 1 to 3;
wherein the groups associated with the m integer, A, and the groups associated with the r integer are bonded only to the carbon atom adjacent thereto;
wherein the poly(meth)acrylate star polymer has a weight average molecular weight of about 20 to about 500 Kg/mol and a polydispersity index of greater than 1.1 to about 4.0.

2. The poly(meth)acrylate star polymer of claim 1, wherein the short chain alkyl (meth)acrylate monomers include about 10 to about 30 mole percent of a dispersant monomer.

3. The poly(meth)acrylate star polymer of claim 2, wherein the dispersant monomer is a (meth)acrylate monomer of the formula

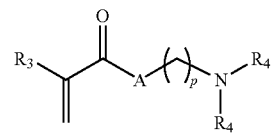

wherein R$_3$ is a hydrogen or methyl, p is an integer from 1 to 6, R$_4$ is independently a C$_1$ to C$_4$ alkyl group, and A is —O— or —NH—.

4. The poly(meth)acrylate star polymer of claim 1, wherein the polymer exhibits a viscosity index of about 200 or greater.

5. The poly(meth)acrylate star polymer of claim 1, wherein n is 0, and m is 4.

6. The poly (meth)acrylate star polymer of claim 1, wherein the oxygen-functional alkyl (meth)acrylate monomers are selected from hydroxy ethyl (meth)acrylate, hydroxy propyl (meth)acrylate, 1-hydroxy propyl (meth) acrylate, 2-hydroxy propyl (meth)acrylate, and combinations thereof.

7. A poly (meth)acrylate star polymer comprising;
a free radical polymerization product of a polyfunctional thiol core and (meth)acrylate monomers wherein the polymerization product has a weight average molecular weight of about 20 to about 500 Kg/mol and a polydispersity index of greater than 1.5 to about 4.0;
the polyfunctional thiol core obtained from a reaction product of a tri- to hexa-functional alcohol and a mercaptocarboxylic acid;
the (meth)acrylate monomers include about 20 to about 35 mole percent short chain alkyl (meth)acrylate monomers with alkyl chain lengths of 1 to 4 carbons, about 60 to about 80 mole percent long chain alkyl (meth) acrylate monomers with alkyl chain lengths of 12 to 20 carbons, and optionally about 5 to about 10 mole percent oxygen-functional alkyl (meth)acrylate monomers with hydroxyl alky chains including 2 to 7 carbons.

8. The poly (meth)acrylate star polymer of claim 7, wherein the tri- to hexa-functional alcohol forming the polyfunctional thiol core is selected from glycerol, pentaerythritol, dipentaerythritol, tripentaerythritol, trimethylolethane, trimethylolpropane, pentahydroxypentane, and mixtures thereof.

9. The poly (meth)acrylate star polymer of claim 7, wherein the mercaptocarboxylic acid is selected from mercaptoacetic acid, mercaptopropionic acid, mercaptobutyric acid, mercaptopentanoic acid, mercaptohexanoic acid, mercaptodecanoic acid, and combinations thereof.

10. The poly (meth)acrylate star polymer of claim 7, wherein the oxygen-functional alkyl (meth)acrylate monomers are selected from hydroxy ethyl (meth)acrylate, hydroxy propyl (meth)acrylate, 1-hydroxy propyl (meth) acrylate, 2-hydroxy propyl (meth)acrylate, and combinations thereof.

11. The poly (meth)acrylate star polymer of claim 7, wherein the weight average molecular weight is about 40 to about 300 Kg/mol.

12. The poly (meth)acrylate star polymer of claim 7, wherein the polymer has a kinematic viscosity at 100° C. of about 50 to about 1500 cSt.

13. A lubricating oil composition comprising:
a major amount of a lubricating oil;
a viscosity index improving polymer including a polymerization product of a polyfunctional thiol and (meth) acrylate monomers forming the polymer of Formula I

[(PMA)-Q-R$_1$—C(O)—O—CH$_2$]$_m$—C-A$_n$   (Formula I)

wherein
PMA is a polymeric chain with randomly polymerized (meth)acrylate monomer units including about 20 to about 35 mole percent short chain alkyl (meth)acrylate monomer units with alkyl chain lengths of 1 to 4 carbons, about 60 to about 80 mole percent long chain alkyl (meth)acrylate monomer units with alkyl chain lengths of 12 to 20 carbons, and optionally about 5 to about 10 mole percent oxygen-functional alkyl (meth) acrylate monomer units with hydroxy alkyl chains including 2 to 7 carbons;
each Q is independently a sulfur atom;
R$_1$ is an alkylene group of 1 to 10 carbons;
A is hydrogen, an alkyl group, or a group independently selected from Formula A1, A2, or A3:

—O—C(O)—R$_1$-Q-(PMA)   (Formula A1);

—C(A1)CH$_2$—O—C(O)—R$_1$-Q-(PMA)   (Formula A2);

—CH$_2$—O—CH2—C—[CH$_2$—O—C(O)-Q-(PMA)]$_r$ (Formula A3);

m is an integer from 1 to 4 and if m is less than 4, then A includes at least one group independently selected from the hydrogen, the alkyl group, or the Formulas A1, A2, or A3;
n is 0 or an integer from 1 to 4;
r is an integer from 1 to 3;
wherein the groups associated with the m integer, A, and the groups associated with the r integer are bonded only to the carbon atom adjacent thereto;
wherein the lubricating oil composition includes, on an active basis, no more than about 10 weight percent viscosity index improving polymer; and
wherein a thickening VI of the lubricating oil composition is about 45 to about 65 viscosity index units per weight percent polymer in the lubricating oil composition.

14. The lubricating oil composition of claim 13, wherein the short chain alkyl (meth)acrylate monomers include about 10 to about 30 mole percent of a dispersant monomer.

15. The lubricating oil composition of claim 13, wherein n is 0, and m is 4.

16. The lubricating oil composition of claim 15, wherein the weight average molecular weight is about 20 to about 500 Kg/mol.

17. The lubricating oil composition of claim 13, wherein the composition has a viscosity index of about 200 to about 350.

* * * * *